(12) United States Patent
Fujimura et al.

(10) Patent No.: US 10,528,017 B2
(45) Date of Patent: Jan. 7, 2020

(54) INFORMATION PROCESSING APPARATUS, INFORMATION PROCESSING METHOD, AND COMPUTER READABLE STORAGE MEDIUM

(71) Applicant: OMRON Corporation, Kyoto (JP)

(72) Inventors: Ryosuke Fujimura, Kusatsu (JP); Nobuyuki Takuma, Kusatsu (JP); Hiromu Suganuma, Ritto (JP); Hiroko Kubo, Kusatsu (JP); Asahi Matsui, Takatsuki (JP)

(73) Assignee: OMRON Corporation, Kyoto (JP)

( * ) Notice: Subject to any disclaimer, the term of this patent is extended or adjusted under 35 U.S.C. 154(b) by 59 days.

(21) Appl. No.: 15/871,098

(22) Filed: Jan. 15, 2018

(65) Prior Publication Data

US 2018/0259926 A1 Sep. 13, 2018

(30) Foreign Application Priority Data

Mar. 13, 2017 (JP) .................................. 2017-047660
May 1, 2017 (JP) .................................. 2017-091050

(51) Int. Cl.
*G05B 19/42* (2006.01)
*G06F 3/0481* (2013.01)
(Continued)

(52) U.S. Cl.
CPC ....... *G05B 19/0425* (2013.01); *G05B 19/045* (2013.01); *G05B 19/0428* (2013.01); *G06F 3/0481* (2013.01); *G05B 9/02* (2013.01)

(58) Field of Classification Search
CPC ............ G05B 19/0425; G05B 19/0428; G05B 19/045; G05B 9/02; G06F 3/0481
See application file for complete search history.

(56) References Cited

U.S. PATENT DOCUMENTS

| | | | | |
|---|---|---|---|---|
| 7,593,124 B1 * | 9/2009 | Sheng | ...................... | G06F 8/71 |
| | | | | 358/1.15 |
| 2015/0018977 A1 | 1/2015 | Law et al. | | |
| 2015/0187524 A1 * | 7/2015 | Prosak | ................... | H01H 50/00 |
| | | | | 361/160 |

FOREIGN PATENT DOCUMENTS

| | | |
|---|---|---|
| DE | 102011109888 | 2/2013 |
| EP | 1744230 | 1/2007 |

(Continued)

OTHER PUBLICATIONS

"Search Report of European Counterpart Application," dated Jul. 24, 2018, p. 1-p. 8.

(Continued)

*Primary Examiner* — Thomas C Lee
*Assistant Examiner* — Anzuman Sharmin
(74) *Attorney, Agent, or Firm* — JCIPRNET

(57) ABSTRACT

An information processing apparatus, information processing method, and computer readable storage medium are provided. An information processing apparatus (200) for generating a safety program for causing output devices to operate such that safety is maintained if a predetermined condition is satisfied includes: an acquisition unit acquiring an input/output setting (230) that correlates respective input devices with output devices that respond to changes in values of input signals from the input devices from a first input value that is an initial value to a second input value; and a generation unit generating, in a case in which a value of an input signal from any of the input devices defined in the input/output setting (230) has changed from the first input value to the second input value, a safety program for shifting an operation state of an output device correlated with the input device to a safety state.

16 Claims, 16 Drawing Sheets

(51) Int. Cl.
*G05B 19/045* (2006.01)
*G05B 9/02* (2006.01)
*G05B 19/05* (2006.01)
*G05B 19/042* (2006.01)

(56) References Cited

FOREIGN PATENT DOCUMENTS

| | | | | |
|---|---|---|---|---|
| EP | 1744230 A2 * | 1/2007 | ........... | G05B 19/058 |
| JP | 2014137621 | 7/2014 | | |

OTHER PUBLICATIONS

"Office Action of Europe Counterpart Application", dated Apr. 8, 2019, p. 1-p. 4.

* cited by examiner

| No | input device | duplication | output device | | | |
|---|---|---|---|---|---|---|
| | | | safety relay 1 | safety relay 2 | safety relay 3 | safety relay 4 |
| 1 | emergency stop switch 1 | activated | 0 | 0 | 0 | 0 |
| 2 | emergency stop switch 2 | inactivated | 0 | 1 | 0 | 0 |
| 3 | safety light curtain 1 | activated | 0 | 0 | 0 | 0 |
| 4 | safety light curtain 2 | inactivated | 0 | 1 | 0 | 0 |
| 5 | safety door | activated | 0 | 0 | 0 | 0 |
| 6 | 2-hand switch | activated | 0 | 1 | 0 | 0 |

FIG. 7

| input device | input FB |
|---|---|
| emergency stop switch | SF_EmergencyStop |
| safety door | SF_GuardMonitoring |
| safety laser scanner | SF_ESPE |
| safety light curtain | SF_ESPE |
| 2-hand switch | SF_TwoHandControlTypeIII |
| safety edge | SF_EmergencyStop |
| single beam safety sensor | SF_ESPE |
| general-purpose safety input device (mechanical contact point) | SF_EmergencyStop |
| general-purpose safety input device (semiconductor output) | SF_ESPE |

FIG. 9

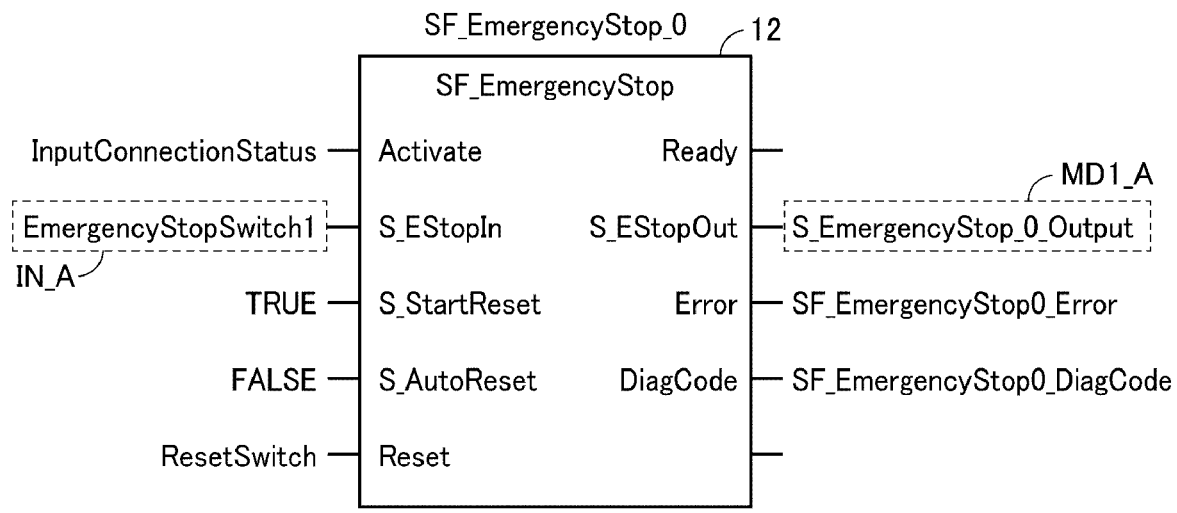

FIG. 10

| output device | output FB |
|---|---|
| safety relay | SF_EDM |
| contactor | SF_EDM |
| servo driver | SF_EDM |
| inverter | SF_EDM |
| general-purpose safety output (welding checked) | SF_EDM |
| eneral-purpose safety output (welding not checked) | SF_OutControl |

INFORMATION PROCESSING APPARATUS, INFORMATION PROCESSING METHOD, AND COMPUTER READABLE STORAGE MEDIUM

CROSS-REFERENCE TO RELATED APPLICATION

This application claims the priority benefit of Japanese Patent Application 2017-047660, filed on Mar. 13, 2017 and Japanese Patent Application 2017-091050, filed on May 1, 2017. The entirety of each of the above-mentioned patent applications is hereby incorporated by reference herein and made a part of this specification.

BACKGROUND

Technical Field

The disclosure relates to an information processing apparatus, an information processing method, and a computer readable storage medium for generating a safety program.

Related Art

In order to safely use machines that are used in many manufacturing sites, input devices (safety components) in accordance with international standards should be used. These input devices are for the purpose of preventing human safety from being threatened by automatically moving apparatuses such as robots. Such input devices include safety controllers that execute safety programs as well as detection devices that detect the presence or intrusion of humans, input devices that receive emergency operations, output devices that actually stop devices, and the like.

As one of technologies for securing safety in such manufacturing sites, Japanese Patent Application Laid-Open (JP-A) No. 2014-137621A (Patent Document 1), for example, discloses a method of supporting design of a user program for a safety controller capable of facilitating the design of a user program for a safety controller.

JP-A No. 2014-137621 (Patent Document 1) discloses a configuration in which a safety controller and a safety Input/Output (I/O) terminal are connected via a bus-type network and the safety controller outputs a command for performing a safety operation to a safety output device that is connected to the safety I/O terminal on the basis of an input signal from a safety input device that is connected to the safety I/O terminal.

Patent Documents

[Patent Document 1] Japanese Patent Application Laid-Open No. 2014-137621

Incidentally, it is necessary for a designer to set input and output relationships between input devices and output devices for a safety program that is executed by a safety controller. Although JP-A No. 2014-137621 described above discloses a method of facilitating the design of a safety program in relation to an input terminal of a safety input device or an output terminal of the safety output device, there is no disclosure regarding facilitating the design of the safety program in relation to the input and output relationships between the safety input devices and the safety output devices.

Therefore, it is desirable to provide a technology for facilitating the design of a safety program in relation to the input and output relationships between the input devices and the output devices.

SUMMARY

According to an aspect, there is provided an information processing apparatus that generates a safety program for causing output devices to operate such that safety is maintained if a predetermined condition is satisfied, the information processing apparatus including: an acquisition unit that acquires an input/output setting, wherein the input/output setting correlates respective input devices with output devices that respond to changes in values of input signals from the input devices from a first input value that is an initial value to a second input value; and a generation unit that generates a safety program for shifting an operation state of an output device correlated with the input device to a safety state in a case in which a value of an input signal from any of the input devices defined in the input/output setting has changed from the first input value to the second input value.

According to another aspect, there is provided an information processing method for generating a safety program for causing output devices to operate such that safety is maintained if a predetermined condition is satisfied, the method comprising the steps of: acquiring input/output setting, wherein the input/output setting correlates respective input devices with output devices that respond to changes in values of input signals from the input devices from a first input value that is an initial value to a second input value; and generating, in a case in which a value of an input signal from any of the input devices defined in the input/output setting has changed from the first input value to the second input value, a safety program for shifting an operation state of an output device correlated with the input device to a safety state.

According to another aspect, there is provided a non-transitory computer readable storage medium for generating a safety program for causing output devices to operate such that safety is maintained if a predetermined condition is satisfied, the non-transitory computer readable storage medium storing a plurality of program instructions, wherein the program instructions are loaded into an information processing apparatus to execute the steps of: acquiring input/output setting, wherein the input/output setting correlates respective input devices with output devices that respond to changes in values of input signals from the input devices from a first input value that is an initial value to a second input value; and generating, in a case in which a value of an input signal from any of the input devices defined in the input/output setting has changed from the first input value to the second input value, a safety program for shifting an operation state of an output device correlated with the input device to a safety state.

According to an aspect, it is possible to facilitate the design of the safety program in relation to the input and output relationships between the input devices and the output devices.

BRIEF DESCRIPTION OF THE DRAWINGS

FIG. 7 is a diagram illustrating an example of input/output setting generated on the basis of setting details illustrated in FIG. 6.

FIG. 9 is a diagram illustrating an example of a data structure of input device settings.

FIG. 10 is a diagram showing an example input function blocks (FBs) that are acquired from the input device settings.

DESCRIPTION OF THE EMBODIMENTS

Figure 1:
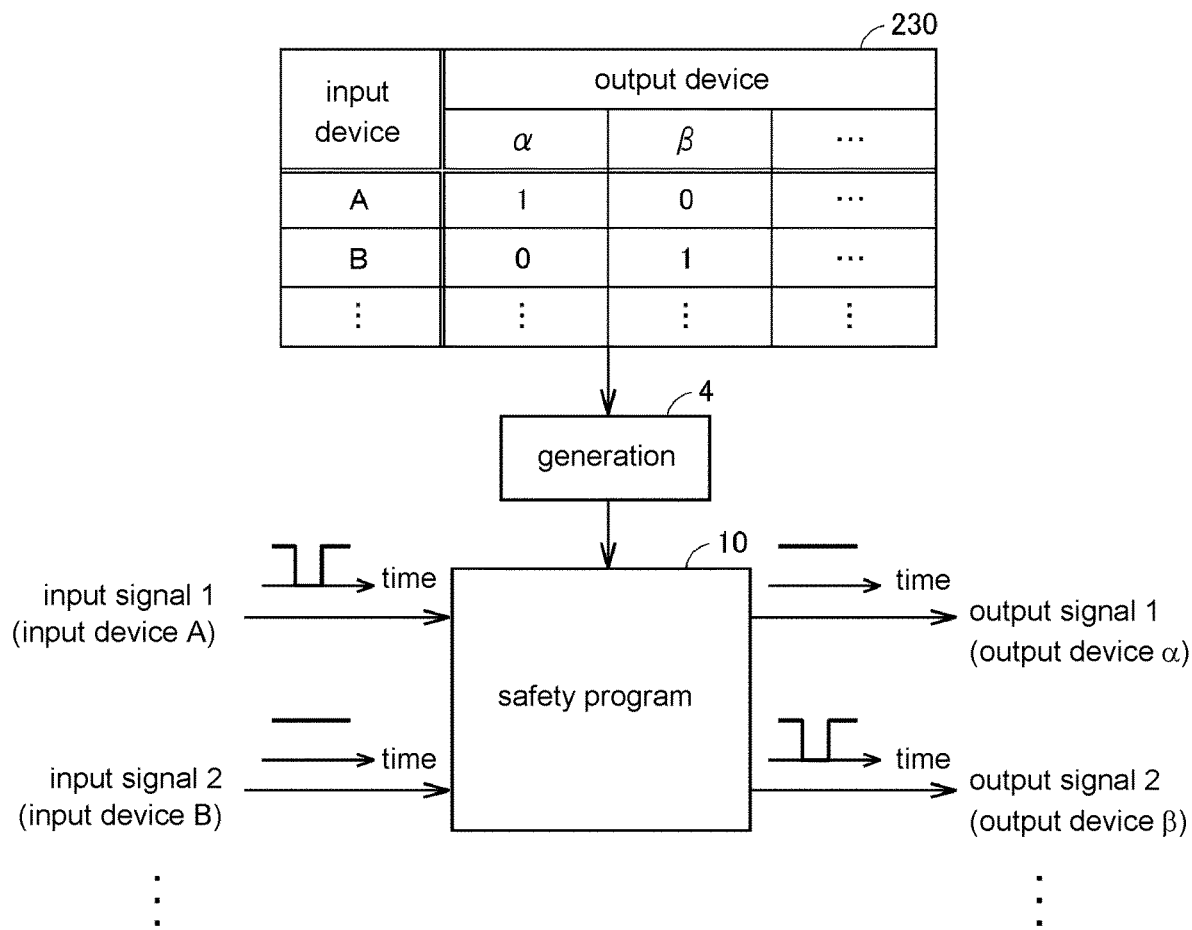
FIG. 1 is a schematic view for explaining an outline of an information processing apparatus according to a first embodiment in terms of functions.

Hereinafter, embodiments of the disclosure will be described with reference to the drawings. In the following description, the same reference numerals will be given to the same parts and components. The names and the functions thereof are also the same. Therefore, detailed description thereof will not be repeated. In addition, the respective embodiments and the respective modification examples described below may be appropriately and selectively combined.

First Embodiment

<A. Outline of Processing Performed by Information Processing Apparatus 200>

First, an outline of an information processing apparatus 200 according to an embodiment will be described. The information processing apparatus 200 has a function of generating a safety program that is executed by a safety controller.

In the specification, the "safety program" is a program for causing output devices to operate such that safety is maintained if predetermined conditions (safety conditions) are satisfied and means a command group that defines processing of the safety controller. More specifically, the safety program includes a combination of commands for determining values of one or more output signals with respect to one or more input signals.

The safety program may be any entity as long as the safety program defines processing of the safety controller. That is, the safety program may be present as one or more source codes, may be present as one or more object codes, or may be in the format (execution format) in which the safety program can be executed by a processor of the safety controller.

In addition, the safety program may be described by using a function block diagram (FBD). Alternatively, the safety program may be described by any of or a combination of a ladder diagram (LD), an instruction list (IL), a structured text (ST), and a sequential function chart (SFC). Further alternatively, the safety program may be described by a general-purpose programming language such as JavaScript (registered trademark) or the C language.

In addition, it is preferable to create the safety program in accordance with stipulations that PLCopen (registered trademark), which is a third-party organization that has conducted distribution activities of international standards IEC (International Electrotechnical Commission) 61131-3 (JIS (Japanese Industrial Standards) B 3503) of PLC programming and planning and authentication of specifications of a standard function block diagram that is independent of vendors, has published in technical committee 5.

In the following description, a safety program that is described as a variable program will be exemplified. Therefore, signals that are actually exchanged between the safety controller and safety components and the like (typically, input signals and output signals) are respectively handled as "variables" in the safety program. Since real signals and corresponding signals in the safety program are substantially the same, these will be collectively referred to as "signals" in some cases in the following description. That is, the "signals" can include electrical signals that are actually exchanged and variables that refer to values assigned to the electrical signals on the safety controller.

FIG. 1 is a schematic view for explaining an outline of the information processing apparatus 200 according to the embodiment in terms of functions. Referring to FIG. 1, the information processing apparatus 200 includes a safety program 10 generation function 4 as a main function thereof.

The safety program is generated on the basis of input/output setting 230. The input/output setting 230 defines input and output relationships between input signals from the respective input devices and output signals output to the respective output devices. Typically, values of the input signals and the output signals at a normal time are represented as "TRUE" ("1" or "true"). That is, in a case in which a safety operation is performed under certain conditions, the output values become "FALSE" by changing the values of the input signals that serve as a trigger of the safety operation to "FALSE" ("0" or "false"). A target apparatus performs the safety operation due to the output values of "FALSE".

In the input/output setting 230, when the values of the input signals from the input devices are changed from "TRUE" to "FALSE", output devices to be shifted to a safety state are represented as "FALSE" ("0" or "false") while output devices to be maintained in an operating state are represented as "TRUE" ("1" or "true"). The safety state described herein means a state in which the output devices are safely stopped.

The generation function 4 generates the safety program 10 on the basis of the input/output setting 230. In a case in which a value of an input signal from any of the input devices defined in the input/output setting 230 changes from "TRUE" (first input value") to "FALSE" (second input value), the safety program 10 shifts the operating state of an output device defined in the input/output setting 230 to the safety state to respond to the change. In one example, the output device that responds to the change in the input signal is associated with "0", and output devices that do not respond to the change in the input signal are associated with "1". In the example in FIG. 1, the safety program 10 maintains an output device "a" in the operating state and shifts the operating state of an output device "p" to the stopped state when a value of an input signal from an input device "A" changes from "TRUE" to "FALSE". Also, the safety program 10 shifts the operating state of the output device "α" to the stopped state and maintains the output device "β" in the operating state when a value of an input signal from an input device "B" changes from "TRUE" to "FALSE".

As described above, if the input/output setting 230 that define the input and output relationships between the input devices and the output devices are provided, the generation function 4 generates the safety program 10 to perform the signal processing for realizing the input and output relationships. By mounting such a generation function 4, design of the safety program becomes easier in relation to the input and output relationships between the input devices and the output devices.

In addition, although the input/output setting 230 may be set on a user interface that is provided by the information processing apparatus 200 as will be described later, the input/output setting 230 may be designed on another information processing apparatus and be then sent to the information processing apparatus 200. That is, any information processing apparatus 200 is allowed as long as at least the function of generating the safety program 10 from the input/output setting 230 that define the input and output relationships between the input devices and the output devices is mounted.

<B. System Configuration of Safety System 1>

Figure 2:
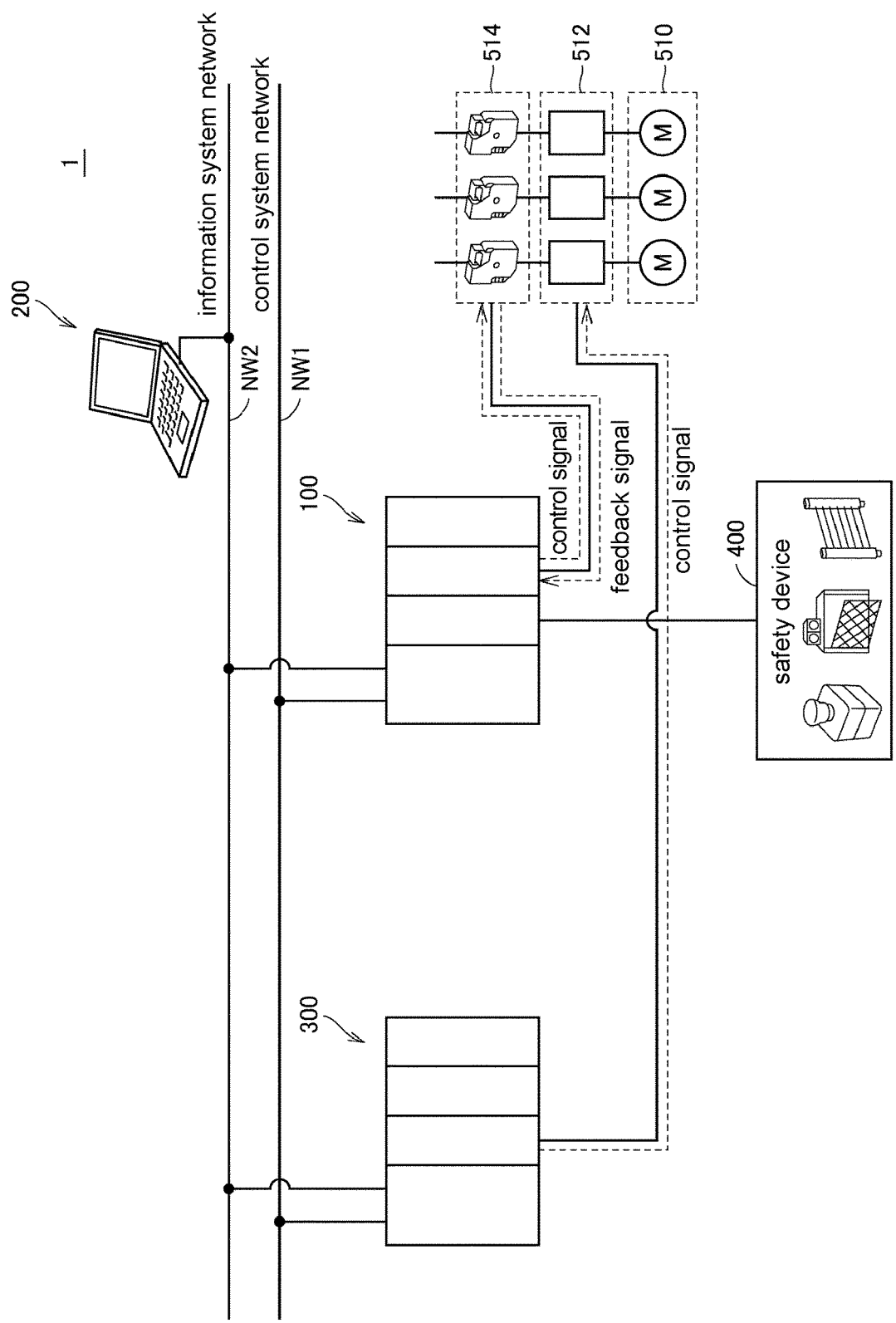
FIG. 2 is a diagram illustrating an example of a system configuration of a safety system according to the first embodiment.

Next, a system configuration of the safety system 1 according to the embodiment will be described. FIG. 2 is a diagram illustrating an example of the system configuration of the safety system 1.

Referring to FIG. 2, the safety system 1 mainly includes a safety controller 100, the information processing apparatus 200, and a control device 300 that controls equipment, machines, and the like.

The control device 300 typically includes a programmable controller (PLC) or the like, executes a user program set in advance in relation to input data that is acquired from a control target, and provides a command to the control target in accordance with output data calculated therefrom. As the control target illustrated in FIG. 2, a motor 510 and a driver 512 that drives the motor 510 will be exemplified. The control device 300 outputs a drive command to the driver 512 in order to drive and rotate the motor 510 if specific drive start condition is satisfied, in accordance with the user program. In addition, the control device 300 stops the output of the drive command to the driver 512 in order to stop the driving and the rotation of the motor 510 if specific drive stop condition is satisfied.

In addition to such control of a control target by the control device 300, the safety controller 100 is typically further arranged in order to secure safety of an operator or the like related to the control target. The safety controller 100 performs a safety operation if conditions (safety conditions) set in advance in relation to input signals from input device 400 (such as a safety sensor, a safety door switch, a safety limit switch, an emergency stop switch, a safety switch, and the like) that serve as safety devices are satisfied.

In the example illustrated in FIG. 2, a safety relay 514 as an example of an output device is arranged on a power supply line to the driver 512. The output device described herein means a device that is driven in conjunction with operations performed on the input device 400. The safety relay 514 drives a contactor for cutting off an electric path, for example. In addition, a hazard area is set in the surroundings of the device that is driven by the motor 510, and the input device 400 is arranged in the surroundings of the hazard area. The input device 400 includes, for example, a detection device that detects the presence or intrusion of persons, an input device that receives emergency operations, and the like. The safety relay 514 is driven by receiving input signals from the input device 400.

In one example, if an input device 400 that serves as an emergency stop switch receives an emergency stop operation from an operator, the safety controller 100 outputs a control signal to the corresponding safety relay 514 in response to a stop signal from the emergency stop switch. The safety relay 514 operates in response to the control signal from the safety controller 100 and cuts off power supply to the driver 512 that drives the motor 510. As a result, the motor 510 is forcibly stopped. By forcibly stopping the motor 510 in this manner, it is possible to secure safety of the operator.

In another example, an input device 400 that serves as a safety sensor detects that an operator has entered the hazard area. If the operator enters the hazard area, the entrance of the operator is detected by the safety sensor. The safety controller 100 outputs a control signal to the corresponding safety relay 514 in response to a detection signal from the safety sensor. The safety relay 514 operates in response to the control signal from the safety controller 100 and cuts off power supply to the driver 512 that drives the motor 510. As a result, the motor 510 is forcibly stopped. By forcibly stopping the motor 510 in this manner, it is possible to secure safety of the operator who has entered the hazard area.

In the configuration example illustrated in FIG. 2, the safety controller 100 and the control device 300 are connected via a control system network NW1 and the data, that the safety controller 100 and the control device 300 internally have, can be mutually exchanged. In addition, the safety controller 100 and the control device 300 are connected to the information processing apparatus 200 via an information system network NW2.

The information processing apparatus 200 is a support tool for providing functions of developing programs that are executed by the safety controller 100 or the control device 300, checking execution states of the programs, changing the programs, and the like. The information processing apparatus 200 is, for example, a personal computer, a tablet terminal, a smartphone, another communication terminal, or the like.

<C. Apparatus Configuration>

Next, apparatus configurations of the apparatuses that form the safety system 1 according to the embodiment will be described with reference to FIGS. 3 and 4.

(c1: Safety Controller 100)

Figure 3:
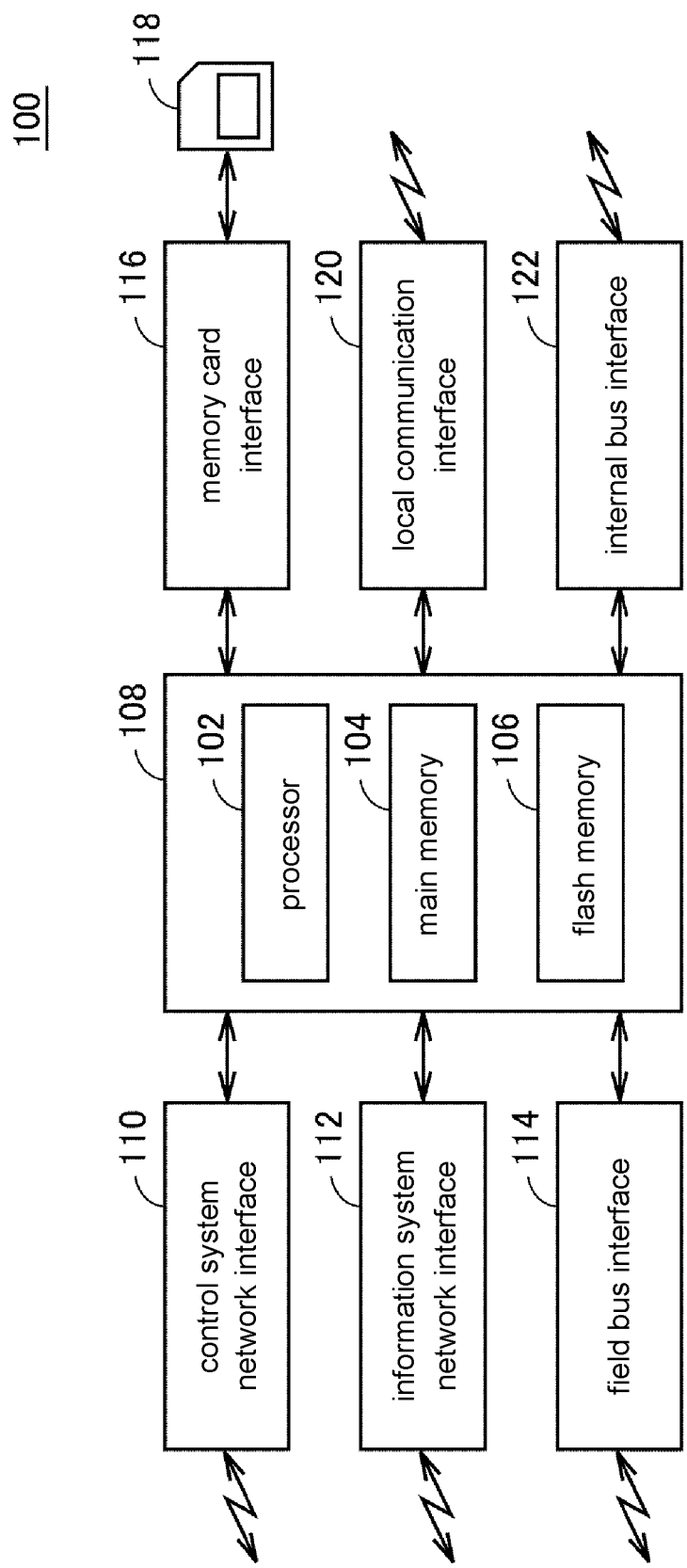
FIG. 3 is a schematic view illustrating an example of an apparatus configuration of a safety controller according to the first embodiment.

FIG. 3 is a schematic view illustrating an example of an apparatus configuration of the safety controller 100 according to the embodiment. Referring to FIG. 3, the safety controller 100 includes a computation processing unit 108 including a processor 102, a main memory 104, and a flash memory 106, and various interfaces.

In the computation processing unit 108, the processor 102 realizes functional safety in accordance with a control target by expanding and executing a system program, a safety program, and the like, which are stored in the flash memory 106, in the main memory 104.

The safety controller 100 includes, as interfaces, a control system network interface 110, an information system network interface 112, a field bus interface 114, a memory card interface 116, a local communication interface 120, an internal bus interface 122.

The control system network interface 110 mediates communication with another apparatus via the control system network NW1 (see FIG. 2). A network protocol that guarantees punctuality, such as EtherCAT (registered trademark), for example, is preferably employed as the control system network NW1.

The information system network interface 112 mediates communication with another apparatus via the information system network NW2 (see FIG. 2). A network protocol that guarantees punctuality, such as EtherNet/IP (registered trademark), for example, is preferably employed as the information system network NW2.

The field bus interface 114 mediates communication with an input/output unit that is connected via a field bus, which is not illustrated in the drawing. A network protocol that guarantees punctuality, such as EtherCAT (registered trademark), EtherNet/IP (registered trademark), DeviceNet (registered trademark), or CompoNet (registered trademark), is preferably employed as the field bus.

The memory card interface 116 is configured such that a memory card 118 can be attached thereto, reads data from the memory card 118, and writes data in the memory card 118.

The local communication interface 120 is an interface that directly connects to the information processing apparatus 200 or another apparatus, and a universal serial bus (USB) or the like is used.

The internal bus interface 122 mediates communication with an input/output unit, which is directly attached to the safety controller 100, via an internal bus.

(c2: Information Processing Apparatus 200)

Next, a hardware configuration of the information processing apparatus 200 will be exemplified. FIG. 4 is a schematic view illustrating an example of the hardware configuration of the information processing apparatus 200 according to the embodiment.

The information processing apparatus 200 may be a mobile terminal such as a notebook PC, a tablet terminal, or a smartphone or may be a non-mobile terminal such as a desktop PC.

The information processing apparatus 200 includes, as main components, a processor 202 that executes an operating system (OS) and various programs, which will be described later, a memory 204 that provides an operation region for storing data that is necessary for the processor 202 to execute the programs, an operation unit 206 that receives user's operations, such as a keyboard or a mouse, an output unit 208 that outputs processing results, such as a display, various indicators, or a printer, a network interface (I/F) 210 for communicating with an external network, an optical drive 212, a local communication interface (I/F) 216 for communicating with a safety controller or the like, and an auxiliary storage device 220. These components are connected so as to be able to communicate data via the internal bus 218 or the like.

The information processing apparatus 200 has the optical drive 212, reads various programs from a computer-readable recording medium 214 such as an optical recording medium (for example, a digital versatile disc (DVD) or the like) that non-transiently stores computer-readable programs, and installs the programs in the auxiliary storage device 220 or the like. The safety program generation processing according to the embodiment may be provided as a part of a development environment program for providing setting, programming, and debugging functions and the like for the safety controller.

The various programs executed by the information processing apparatus 200 may be installed via the computer-readable recording medium 214 or may be installed in a manner in which the programs are downloaded from a server apparatus on a network. A program related to the safety program generation function according to the embodiment is realized in a manner in which a part of modules provided by the OS is used, in some cases. In such cases, all software modules required for realizing the safety program generation function according to the embodiment are not distributed, and only a part thereof is distributed. It is clear that such cases are also included in the technical scope of the disclosure. In addition, the safety program generation function according to the embodiment may be implemented as a part of other programs or software.

The auxiliary storage device 220 includes, for example, a hard disk drive (HDD), a flash solid state drive (SSD), or the like and stores programs that are executed by the processor 202. Specifically, the auxiliary storage device 220 includes an execution program 222 for generating codes (execution modules) that can be executed from the safety program 10 (source program) by the processor 202 and a plurality of function blocks 224 that are prepared in advance, as programs for providing processing as will be described later. The auxiliary storage device 220 stores various settings 226 associated with the safety program 10.

In addition, the auxiliary storage device 220 holds the safety program 10 for causing the output devices to safely operate in response to input signals from the input devices, input device setting 227, which will be described later, output device setting 228, which will be described later, reset device setting 229, which will be described later, and the aforementioned input/output setting 230.

Figure 4:
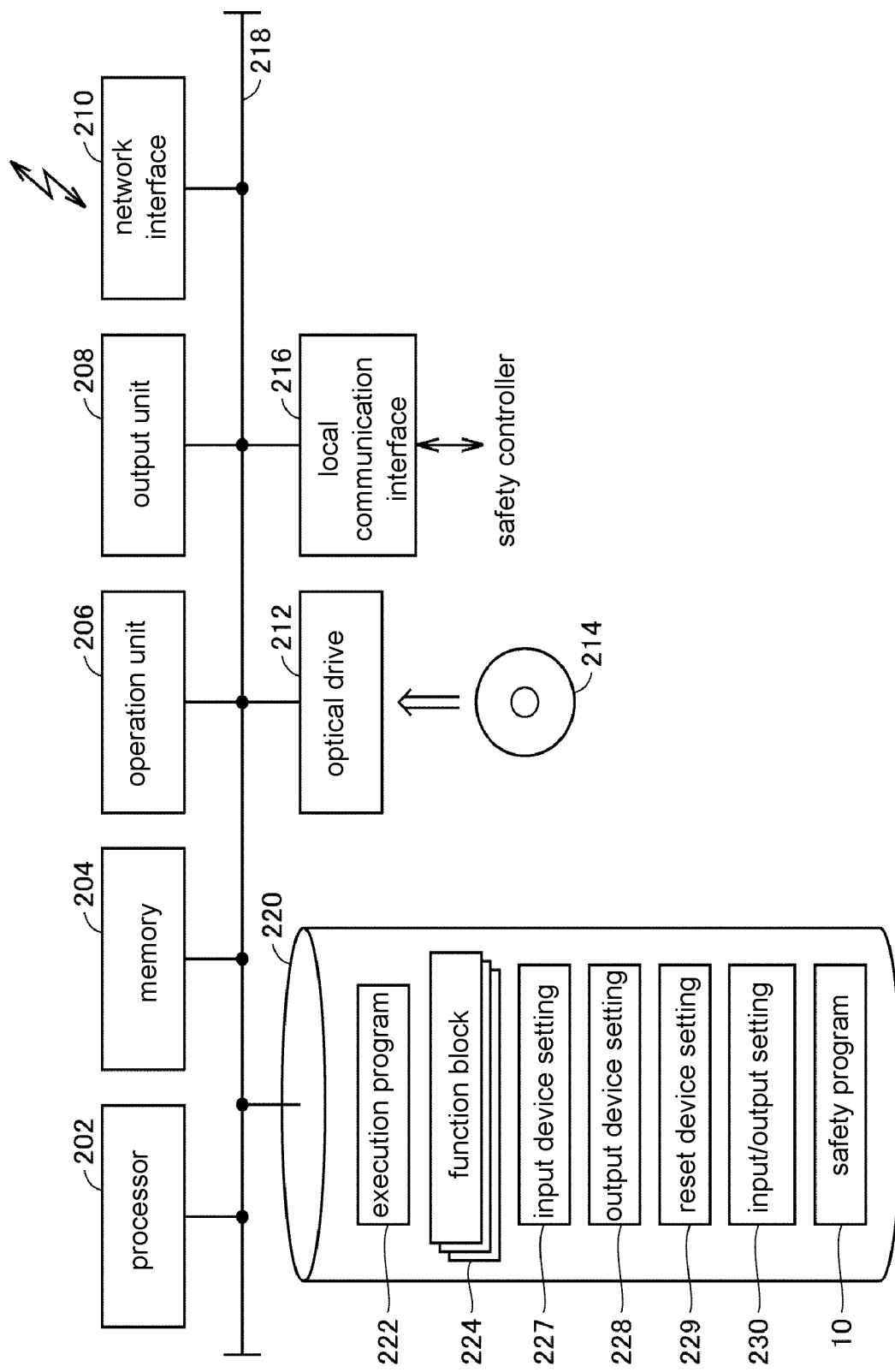
FIG. 4 is a schematic view illustrating an example of a hardware configuration of the information processing apparatus according to the first embodiment.

Although the safety program generation function according to the embodiment is realized by a general-purpose computer executing the program in FIG. 4, an entirety or a part of the safety program generation function may be implemented by a hard-wired circuit instead of such a configuration. For example, the functions provided by the processor 202 executing the aforementioned various programs may be implemented by using an application specific integrated circuit (ASIC) or a field-programmable gate array (FPGA).

(c3: Control Device 300)

Since the control device 300 according to the embodiment has a similar apparatus configuration to that of the safety controller 100 illustrated in FIG. 3, detailed description thereof will not be repeated. In addition, although the safety controller 100 employs duplication of processors and the like and safety modules, such a configuration is generally not employed for the control device 300. In addition, the control device 300 executes a user program instead of the aforementioned safety program.

D. Functional Configuration of Information Processing Apparatus 200>

Figure 5:
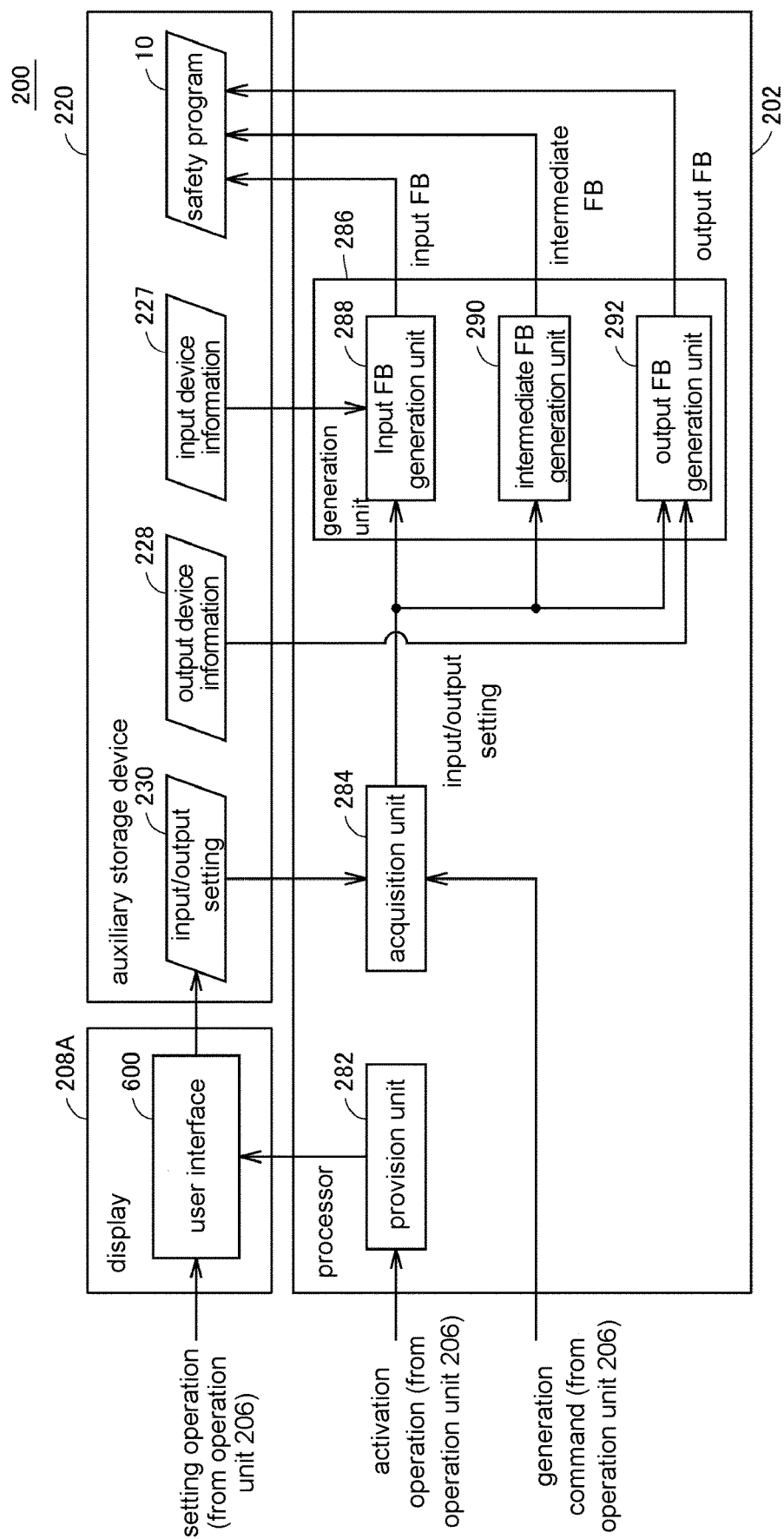
FIG. 5 is a diagram illustrating an example of a functional configuration of the information processing apparatus according to the first embodiment.

Functions of the information processing apparatus 200 will be described with reference to FIGS. 5 to 15. FIG. 5 is a diagram illustrating an example of a functional configuration of the information processing apparatus 200.

As illustrated in FIG. 5, the information processing apparatus 200 includes, as main hardware configurations, the processor 202, a display 208A as an example of the output unit 208 (see FIG. 4), and the auxiliary storage device 220. The processor 202 includes, as functional configurations, a provision unit 282, an acquisition unit 284, and a generation unit 286. The generation unit 286 includes an input FB generation unit 288, an intermediate FB generation unit 290, and an output FB generation unit 292.

Hereinafter, these functional configurations will be described in order.

(D1. Provision Unit 282)

Figure 6:
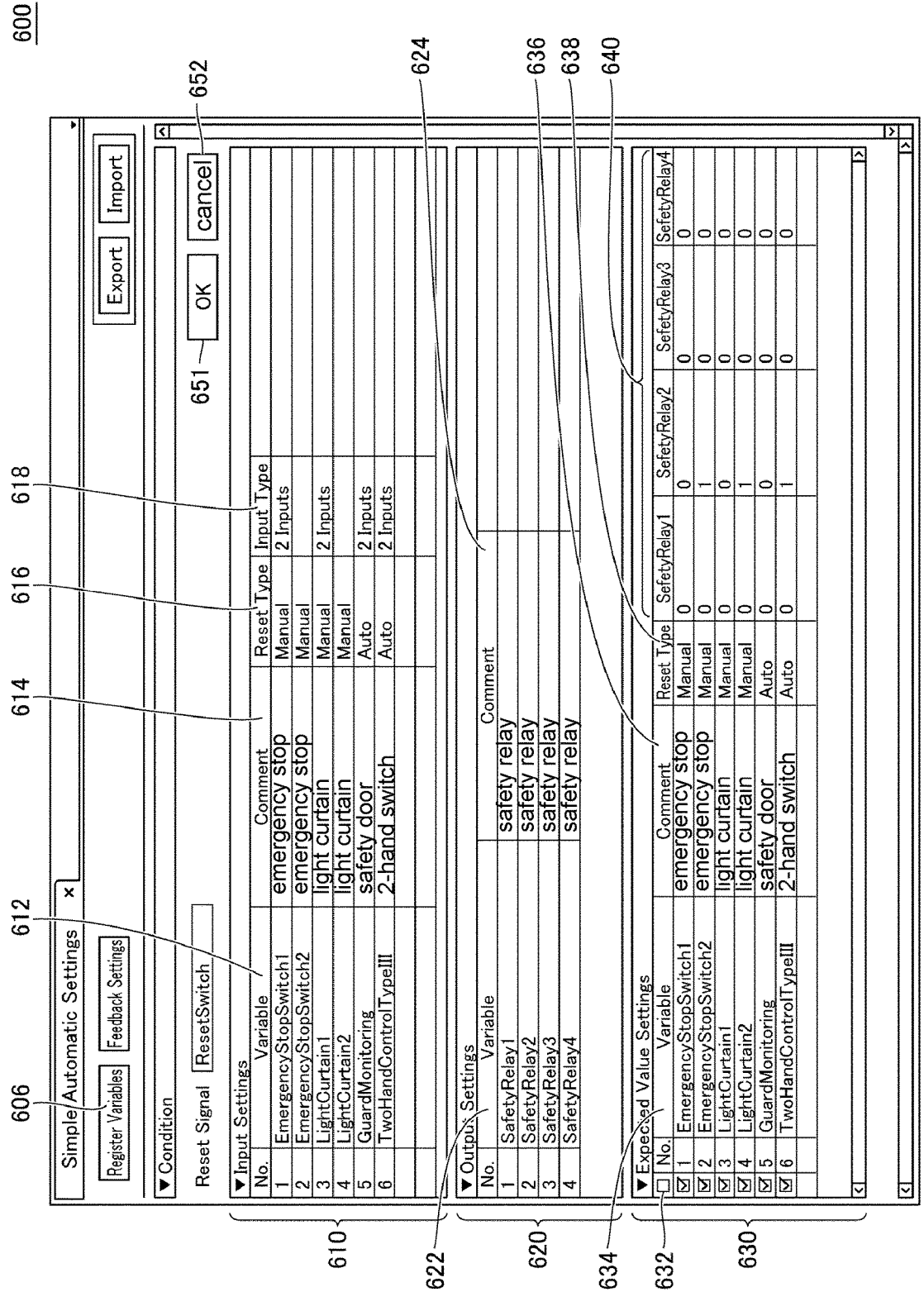
FIG. 6 is a diagram illustrating a user interface as an example of a design screen of a safety program.

The provision unit 282 displays a design screen of the safety program 10 on the display 208A on the basis of activation of an application for designing the safety program 10. FIG. 6 is a diagram illustrating a user interface 600 as an example of the design screen of the safety program 10.

The user interface 600 includes an input setting display area 610 that displays setting values related to input signals (input variables) from the input devices, an output setting display area 620 that displays setting values related to output signals (output variables) to the output devices, and an input and output relationship setting area 630 that sets a correspondence between the input variables and the output variables.

In the input setting display area 610, information related to the input variables included in a target safety program can be registered and displayed. In the output setting display area 620, information related to the output variables included in the target safety program can be registered and displayed. The registration of the variables in the input setting display area 610 and the output setting display area 620 is activated by a variable registration button 606 being selected.

The input setting display area 610 includes a variable name display section 612 that displays variable names of the input variables set in advance, a comment display section 614 that displays comments for the corresponding input variables, a reset type display section 616 that displays reset types for the corresponding input variables, and an input type display section 618 that displays input types for the corresponding input variables. By designating an input type in the input type display section 618, whether or not to activate reception of duplicated input signals from the input devices is set. That is, whether or not to assign two input variables are to be assigned to the same input device is set in the input type display section 618.

The output setting display area 620 includes a variable name display section 622 that displays variable names of the output variables set in advance and a comment display section 624 that displays comments for the corresponding output variables.

The input and output relationship setting area 630 receives a setting of an input and output relationships between the input devices and the output devices. The input and output relationship setting area 630 includes an input variable display area 634 that displays target input variables, a comment display section 636 that displays comments for the corresponding input variables, a reset type display section 638 that displays reset type for the corresponding input variables, and a setting region group 640 for setting the input and output relationships between the input devices and the output devices.

The respective setting regions in the setting region group 640 are arranged in a matrix form. The respective setting regions in the setting region group 640 are prepared to correspond to the number of combinations between the input devises registered in the input setting display area 610 and the output devices registered in the output setting display area 620. The input devices (input variables) represented in the input setting display area 610 are associated with the column direction of the setting region group 640. The output devices (output variables) represented in the output setting display area 620 are associated with the row direction of the setting region group 640. The respective setting regions that form the setting region group 640 receive setting indicating whether or not the output devices associated with the setting regions are to respond to changes in values of the input signals from the input devices associated with the setting regions. That is, the setting region group 640 is configured to receive a setting of the output devices that respond to the changes in the input signals from the input devices for the respective input devices.

The setting region group 640 is configured such that output values are set to correspond to the number of target output variables for one input variable. In the example of the user interface 600 illustrated in FIG. 6, four sections are provided to correspond to four output variables displayed in the output setting display area 620, and input/output setting can be set for each section. A user sets a necessary value in the setting region group 640 on the basis of prior safety design. In addition, "0" means that a corresponding output variable also changes to "FALSE" in a case in which a corresponding input variable changes to "FALSE", and "1" means that the corresponding output variable is maintained to be "TRUE" even in a case in which the corresponding input variable changes to "FALSE", in the setting region group 640 in FIG. 6.

In a case in which a certain emergency stop button A triggers a safety operation of an apparatus A that is arranged in a hazard area A, for example, "FALSE" indicating the safety operation, that is, "0" is set as the input/output setting for an output variable indicating a command for the safety relay that manages emergency stop of the certain apparatus A in the hazard area A in association with an input variable corresponding to an input signal from the emergency stop button A. Meanwhile, in a case in which the emergency stop button A is not for a hazard area B and another emergency stop button B is provided in the hazard area B, stop of an apparatus B in the hazard area B by an operation performed on the emergency stop button A is not scheduled. Therefore, "TRUE" indicating that no safety operation is performed, that is, "1" is set as the input/output setting for an output variable indicating a command for the safety relay that manages emergency stop of the apparatus B in the hazard area B in association with an input variable corresponding to the input signal from the emergency stop button A. As described above, a relationship between each of the input variables and the respective output variables is set in the setting region group 640.

If an OK button 651 is pressed, information related to the input devices registered in the input setting display area 610, information related to the output devices registered in the output setting display area 620, and setting details set in the input and output relationship setting area 630 are reflected in the input/output setting 230 (see FIG. 4). At the same time, the setting details set in the reset type display section 638 are reflected in the reset device setting 229. If a cancel button 652 is pressed, the setting details set in the user interface 600 are not reflected in the input/output setting 230 illustrated in FIG. 7, and the user interface 600 is closed.

FIG. 7 is a diagram illustrating an example of the input/output setting 230 generated on the basis of the setting details illustrated in FIG. 6. As illustrated in FIG. 7, the input/output setting 230 includes input device information 230A, duplication information 230B, an output device information 230C, and an input and output information 230D.

The input devices to which the input variables registered in the input setting display area 610 are assigned are reflected in the input device information 230A. The setting details in the input type display section 618 are reflected in the duplication information 230B. The output devices to which the output variables registered in the output setting display area 620 are assigned are reflected in the output device information 230C. The input and output relation set in the setting region group 640 is reflected in the input and output information 230D.

(D2. Acquisition Unit 284)

Next, functions of the acquisition unit 284 illustrated in FIG. 5 will be described.

The acquisition unit 284 acquires the input/output setting 230, which have been stored in the auxiliary storage device, on the basis of reception of a generation command of the safety program 10. The generation command of the safety program 10 may be issued at a timing when the OK button 651 in the interface 600 is pressed or may be issued on the basis of another user's operation.

The acquired input/output setting 230 is output to the input FB generation unit 288, the intermediate FB generation unit 290, and an output FB generation unit 292.

(D3. Generation Unit 286)

Figure 8:
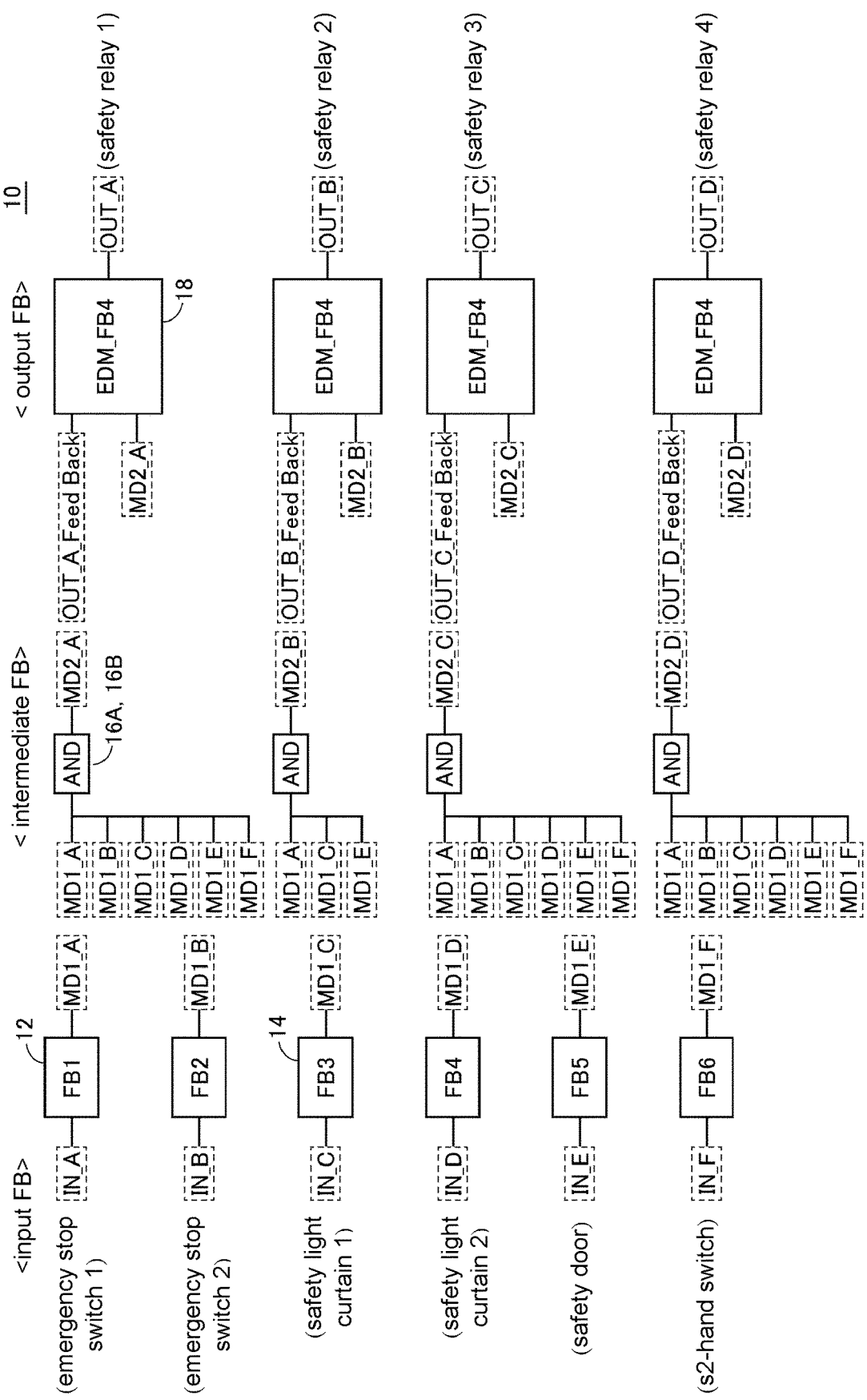
FIG. 8 is a diagram illustrating an outline of the safety program that is generated by a generation unit.

Next, functions of the generation unit 286 illustrated in FIG. 5 will be described with reference to FIG. 8. FIG. 8 is a diagram illustrating an outline of the safety program 10 generated by the generation unit 286.

As illustrated in FIG. 8, the generation unit 286 generates input FBs that receive the input signals from the input devices as inputs, intermediate FBs that perform logical computation on the input signals from the input FBs, and output FBs that perform predetermined computation on intermediate signals from the intermediate FBs and outputs output signals to the corresponding output devices as computation results, on the basis of the input/output setting 230 (see FIG. 7) set by the aforementioned user interface 600 (see FIG. 6). The generated input FBs, the intermediate FBs, and the output FBs form the safety program 10.

More specifically, the generation unit 286 generates the input FBs for the respective input devices defined in the input/output setting 230. In a case in which the input FBs are generated from the input/output setting 230 illustrated in FIG. 7, six input FBs are generated as illustrated in FIG. 8. The input variables set in the variable name display section 612 in the aforementioned user interface 600 (see FIG. 6) are assigned as inputs to the respective input FBs. As a result, input variables IN_A to IN_F are respectively assigned to the input FBs. The respective input FBs execute computation set in advance in accordance with changes in the assigned input variables. The computation results are reflected in first intermediate variables MD1_A to MD1_F assigned as outputs.

Typically, values of the input variables IN_A to IN_F at a normal time become "TRUE", and values of the first intermediate variables MD1_A to MD1_F also become "TRUE". That is, in a case in which the safety operation is performed under certain conditions, the corresponding first intermediate variables also change to "FALSE" if the values of the input variables IN_A to IN_F that trigger the safety operation change to "FALSE".

The generation unit 286 further generates the intermediate FBs on the basis of the input and output relationships between the input devices and the output devices defined in the input/output setting 230. The intermediate FBs are generated for the respective output devices defined in the input/output setting 230. In a case in which the intermediate FBs are generated from the input/output setting 230 illustrated in FIG. 7, four intermediate FBs are generated as illustrated in FIG. 8. At least one of the first intermediate variables MD1_A to MD1_F is assigned to each intermediate FB as an input. The first intermediate variables assigned are determined on the basis of the input and output relationships defined in the input/output setting 230. Typically, a connection relation is established for a combination between the input device and the output device for which "FALSE" (that is, 0) is set in the input/output setting 230.

Since connection with all the input devices is defined for a safety relay "1" as an example of the output devices in the example in FIG. 7, all the first intermediate variables MD1_A to MD1_F are assigned to the intermediate FBs for the safety relay "1" as illustrated in FIG. 8.

In addition, since connection with an "emergency stop switch 1", a "safety light curtain 1", and a "safety door" is defined for a safety relay "2" as an example of the output devices in the example in FIG. 7, the first intermediate variables MD1_A1, MD1_C1, and MD1_E1 are assigned to the intermediate FBs for the safety relay "2" as illustrated in FIG. 8.

In addition, since connection with all the input devices is defined for a safety relay "3" as an example of the output devices in the example in FIG. 7, all the first intermediate variables MD1_A to MD1_F are assigned to the intermediate FBs for the safety relay "3" as illustrated in FIG. 8.

In Addition, since connection with all input devices is defined for a safety relay "4" as an example of the output devices, all the first intermediate variables MD1_A to MD1_F are assigned to the intermediate FBs for the safety relay "4" as illustrated in FIG. 8.

Typically, the intermediate FBs execute AND computation on the values of the assigned first intermediate variables. The computation results are reflected in second intermediate variables MD2_A to MD2_D assigned to the respective intermediate FBs as outputs. In a case in which the value of the first intermediate variable MD1_A changes from "TRUE" to "FALSE" in one example, the values of the second intermediate variables MD2_A to MD2_D change from "TRUE" to "FALSE". In a case in which the value of the first intermediate variable MD1_B changes from "TRUE" to "FALSE", the values of the second intermediate variables MD2_A, MD2_C, and MD2_D change from "TRUE" to "FALSE, and the value of the second intermediate variable MD2_B is maintained to be "TRUE".

The generation unit 286 further generates the output FBs for the respective output devices defined in the input/output setting 230. In a case in which the output FBs are generated from the input/output setting 230 illustrated in FIG. 7, four output FBs are generated as illustrated in FIG. 8. The respective output FBs execute computation set in advance in accordance with changes in the assigned second intermediate variables. The computation results are reflected in output variables OUT_A to OUT_D assigned to the respective output FB as outputs. Typically, in a case in which the values of the second intermediate variables MD2_A to MD2_D change from "TRUE" to "FALSE", the values of the output variables OUT_A to OUT_D change from "TRUE" to "FALSE". In a case in which the values of the output variables change from "TRUE" to "FALSE", the operating state of the output devices as output destinations of the output variables is shifted to the safety state. In a case in which the values of the output variables are "TRUE", the operating state of the output devices as the output destinations of the output variables is maintained.

(D4. Input FB Generation Unit 288)

As described above, the generation unit 286 generates the input FBs, the intermediate FBs, and the output FBs on the basis of the input/output setting 230. The input FBs are generated by the input FB generation unit 288 illustrated in FIG. 5. Hereinafter, functions of the input FB generation unit 288 will be described with reference to FIGS. 9 to 11.

The input FB generation unit 288 specifies the input FBs corresponding to the respective input devices defined in the input/output setting 230 with reference to the input device setting 227 illustrated in FIG. 9 and includes the input FBs in the safety program 10.

FIG. 9 is a diagram illustrating an example of a data structure of the input device setting 227. In the input device setting 227, the input FBs used are uniquely associated with the respective input devices. The input FB generation unit 288 specifies the input devices that coincide with ones set in the input/output setting 230 (see FIG. 7) from among the input devices defined in the input device setting 227 and acquires the input FBs associated with the input devices.

Figure 11:
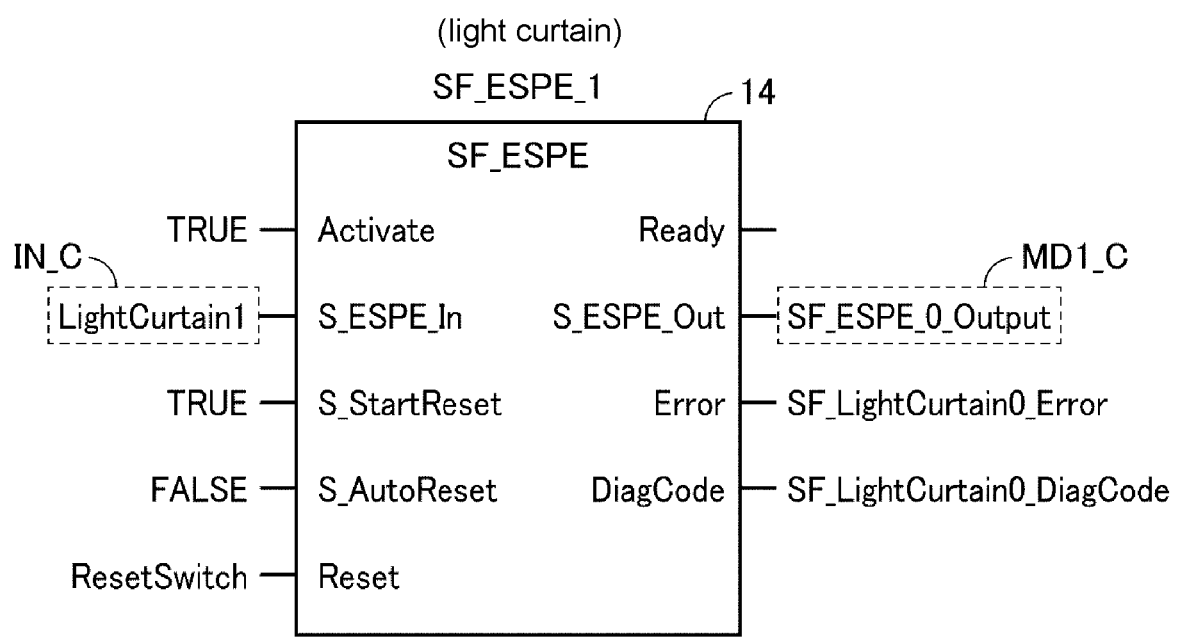
FIG. 11 is a diagram showing another example of the input FBs that are acquired from the input device settings.

FIG. 10 is a diagram showing an example of the input FBs that are acquired from the input device setting 227. FIG. 10 illustrates an emergency stop FB 12 as an example of the acquired input FBs. The emergency stop FB 12 is logic for processing an input signal from the emergency stop button. FIG. 11 is a diagram showing another example of the input FBs that are acquired from the input device setting 227. FIG. 11 illustrates an emergency stop FB 14 as one of the acquired input FBs. The emergency stop FB 14 is logic for processing an input signal from the light curtain.

Each of the emergency stop FBs 12 and 14 has a total of five inputs, namely "Activate" for setting activation/inactivation of the processing of the function block, "S_EStopin" to which a signal output from the input device related to the emergency stop is input, "S-StartReset" to which a signal for setting whether or not to start execution of a program after reset is input, "S-AutoReset" to which a signal for setting a reset type after the safety operation is input, and "Reset" to which a signal for resetting the operation after the safety operation is input.

In addition, each of the emergency stop FBs 12 and 14 has a total of four outputs, namely "Ready" for outputting a signal indicating whether or not the function block is in an operating state, "S_EStopOUT" for outputting a signal indicating a safety operation, "Error" for outputting a signal indicating occurrence of a certain error, and "DiagCode" for outputting a code corresponding to content of the error that has occurred.

In the embodiment, the safety program 10 sets the input values and the output values at the normal time to "TRUE" ("1" or "true"). That is, in a case in which the safety operation is performed under certain conditions, the output values also become "FALSE" due to the input values that trigger the safety operation changing to "FALSE ("0" or "false")", and the target apparatus performs the safety operation in accordance with the output values of "FALSE".

A different value from a value (that is, "FALSE") indicated in the same memory state as that when a power source supplied to the safety controller that executes the safety program 10 is lost is used for "TRUE" set as initial values of the input signals and the output signals. That is, so-called fail-safe in which a safety operation is performed at the time of malfunction of hardware or the like can be realized by using a different value from the value indicated in a state in which electric charge or the like is not held in a nonvolatile memory of the safety controller.

The assignment of the values to the input values and the output values at the normal time and the abnormal time is a design matter, and any assignment may be employed. However, it is preferable to set the input values and the output values at the normal time to "TRUE" in terms of the aforementioned fail safe and the like.

A variable "EmergencyStopSwitch1" indicating a signal output from the emergency stop button is assigned to the input "S EStopIn" of the emergency stop FB 12 while a variable "ResetSwitch" indicating system reset for the safety controller is assigned to the input "Reset". The assignment is performed on the basis of the setting details registered in the input setting display area 610 in the aforementioned user interface 600. In addition, the variable "EmergencyStopSwitch1" corresponds to an input variable IN_A in FIG. 10.

A variable "LightCurtain1" indicating a signal output from the light curtain is assigned to the input "S_EStopin" of the emergency stop FB 14 while a variable "ResetSwitch" indicating system reset for the safety controller is assigned to the input "Reset". The assignment is performed on the basis of setting details registered in the input setting display area 610 in the aforementioned user interface 600. In addition, the variable "LightCurtain1" corresponds to an input variable IN_C in FIG. 10.

"TRUE", that is, activation of processing is set for "Activate", "TRUE", that is, execution of the program after reset is set for "S_StartReset", and "FALSE", that is, "manual reset" is set as a reset type for "S AutoReset" of both the emergency stop FBs 12 and 14. The assignment is performed on the basis of the setting details registered in the reset type display section 616 in the aforementioned user interface 600 (see FIG. 6).

The Reset type for "S_AutoReset" is set in the reset type display section 616 in the aforementioned user interface 600 (see FIG. 6). Reset types include "automatic reset" and "manual reset".

Figure 12A:
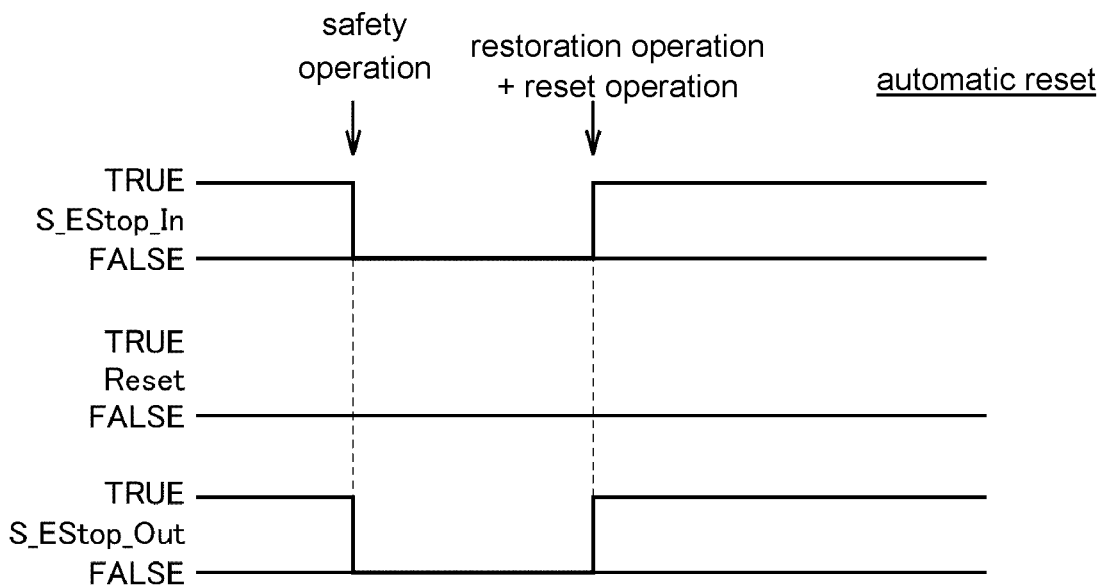
FIGS. 12(A) and 12(B) are a diagram for explaining reset types set for an emergency stop FB that is included in the safety program.
Figure 12B:
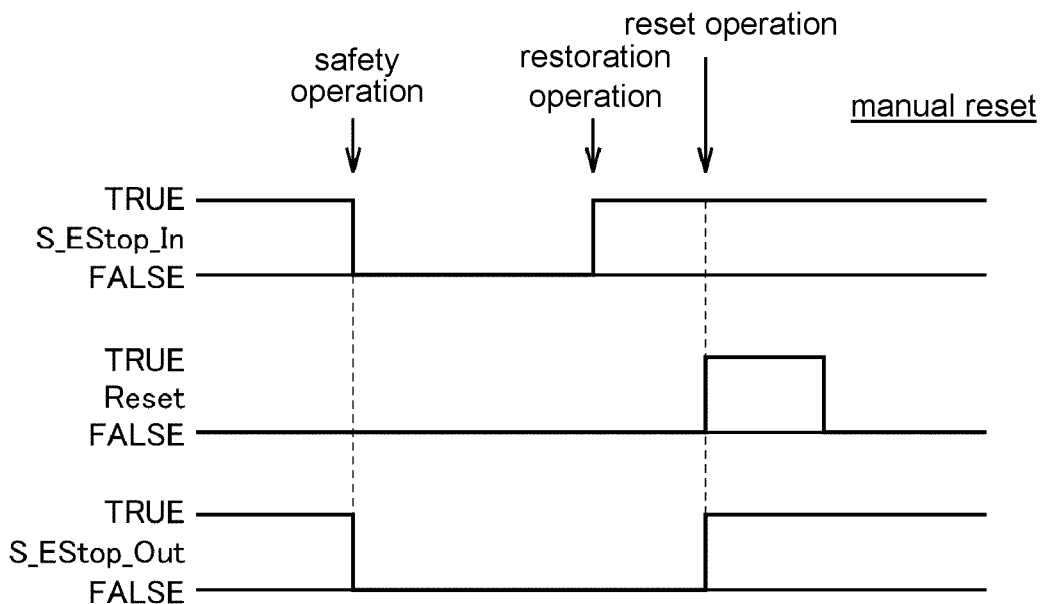

Hereinafter, "automatic reset" and "manual reset" will be described with reference to FIGS. 12(A) and 12(B). FIGS. 12(A) and 12(B) are a diagram for explaining reset types set for the emergency stop FB that is included in the safety program 10 according to the embodiment.

FIG. 12(A) illustrates a case in which "automatic reset" has been set as the reset type, while FIG. 12(B) illustrates a case in which "manual reset" has been set as the reset type.

In the "automatic reset" illustrated in FIG. 12(A), the output "S_EStopOUT" of the emergency stop FB changes from "TRUE" to "FALSE" if the input "S_EStopin" of the emergency stop FB changes from "TRUE" to "FALSE". The safety operation is performed in accordance with this change in "S_EStopOut". Thereafter, the reset operation is also executed if the input "S_EStopin" of the emergency stop FB is restored from "FALSE" to "TRUE. That is, the output "S_EStopOUT" of the emergency stop FB also changes in conjunction with the input "S_EStopIn" of the emergency stop FB.

In the "manual reset" illustrated in FIG. 12(B), the output "S_EStopOut" of the emergency stop FB is maintained to be "FALSE" even if the input "S_EStopin" of the emergency stop FB is restored from "FALSE" to "TRUE" after the input "SEStopin" of the emergency stop FB changes from "TRUE" to "FALSE" and the output "S_EStopOut" of the emergency stop FB changes from "TRUE" to "FALSE". By changing the input "Reset' of the emergency stop FB from "FALSE" to "TRUE" in this state, first the output "S_ESTopOut" of the emergency stop FB changes from "FALSE" to "TRUE".

The "automatic reset" is preferable for a case in which the safety operation is performed only when the input signal from the safety component such as a light curtain is "FALSE", for example. For example, the "automatic reset" can be used for a situation in which the apparatus is stopped only when a person has entered a hazard area and the apparatus is operated in other states. It is possible to reduce influence on a tact time while securing safety of the operator by setting such "automatic reset".

The "manual reset" is a general reset type and is preferable for a case in which a safety component such as an emergency stop button is operated, the safety operation is performed, and a predetermined restoration operation is then needed for reset. For example, in a case in which the emergency stop button is operated, and the apparatus is stopped in the process of an operation, or the like, it is preferable to return the apparatus to an initial position and to then reset the apparatus.

As described above, the reset types include the "automatic reset" (first type) indicating that the output value of the corresponding output signal is returned to an original value in conjunction with the return of the value of the input signal from "FALSE" (second input value) to "TRUE" (first input value) and the "manual reset" (second type) indicating that the output value of the output signal is not returned to the original value until reset conditions set in advance are satisfied.

(D5. Intermediate FB Generation Unit 290)

As described above, the generation unit 286 generates the input FBs, the intermediate FBs, and the output FBs on the basis of the input/output setting 230. The intermediate FBs are generated by the intermediate FB generation unit 290 illustrated in FIG. 5. Hereinafter, functions of the intermediate FB generation unit 290 will be described with reference to FIG. 13.

Figures 13, 14:
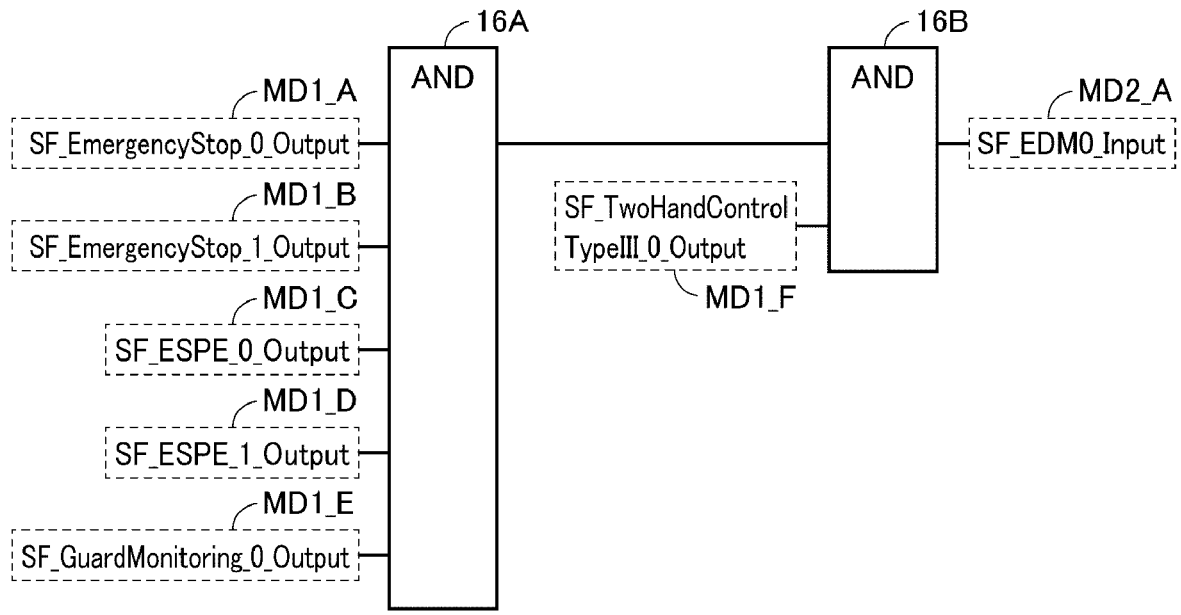
FIG. 13 is a diagram showing one of intermediate FBs that are generated by an intermediate FB generation unit.
FIG. 14 is a diagram illustrating an example of a data structure of output device settings.

The intermediate FB generation unit 290 generates the intermediate FBs on the basis of the input and output relationships between the input devices and the output devices defined in the input/output setting 230 illustrated in FIG. 7. FIG. 13 is a diagram showing one of the intermediate FBs generated by the intermediate FB generation unit 290. FIG. 13 illustrates AND operators 16A and 16B as one of the generated intermediate FBs.

The AND operators 16A and 16B are generated for the safety relay "1" (see FIG. 7) defined in the input/output setting 230. As described above, a connection relation is established for combinations between the input devices and the output devices for which "FALSE" (that is, "0") is set in the input/output setting 230. Since "0" is associated with all the input devices for the safety relay "1" illustrated in FIG. 7, the intermediate FBs are generated to connect to all the input devices. As a result, the first intermediate variables MD1_A to MD1_F are assigned to the AND operators 16A and 16B.

In addition, the second intermediate variable MD2_A is assigned as the output to the intermediate FBs as illustrated in FIG. 13. The value of the second variable MD2_A changes from "TRUE" to "FALSE" on the basis of a change in any of the first intermediate variables MD1_A to MD1_E from "TRUE" to "FALSE". In a case in which all the first intermediate variables MD1_A to MD1_E are "TRUE", the value of the second intermediate variable MD2_A is maintained to be "TRUE".

In addition, although FIG. 13 illustrates an example in which the AND operators 16A and 16B are separated into two AND operators, the AND operators 16A and 16B may be represented by one AND operator. In any cases, the same computation result is obtained.

(D6. Output FB Generation Unit 292)

As described above, the generation unit 286 generates the input FBs, the intermediate FBs, and the output FBs on the basis of the input/output setting 230. The output FBs are generated by the output FB generation unit 292 illustrated in FIG. 5. Hereinafter, functions of the output FB generation unit 292 will be described with reference to FIGS. 14 and 15.

The output FB generation unit 292 specifies the output FBs corresponding to the respective output devices defined in the input/output setting 230 with reference to the output device setting 228 illustrated in FIG. 14 and includes the output FBs in the safety program 10.

FIG. 14 is a diagram illustrating an example of a data structure of the output device setting 228. In the output device setting 228, the output FBs used are uniquely associated with the respective output devices. The output FB generation unit 292 specifies ones that coincide with the output devices set in the input/output setting 230 (see FIG. 7) from among the output devices defined in the output device setting 228 and acquires the output FBs associated with the output devices.

Figure 15:
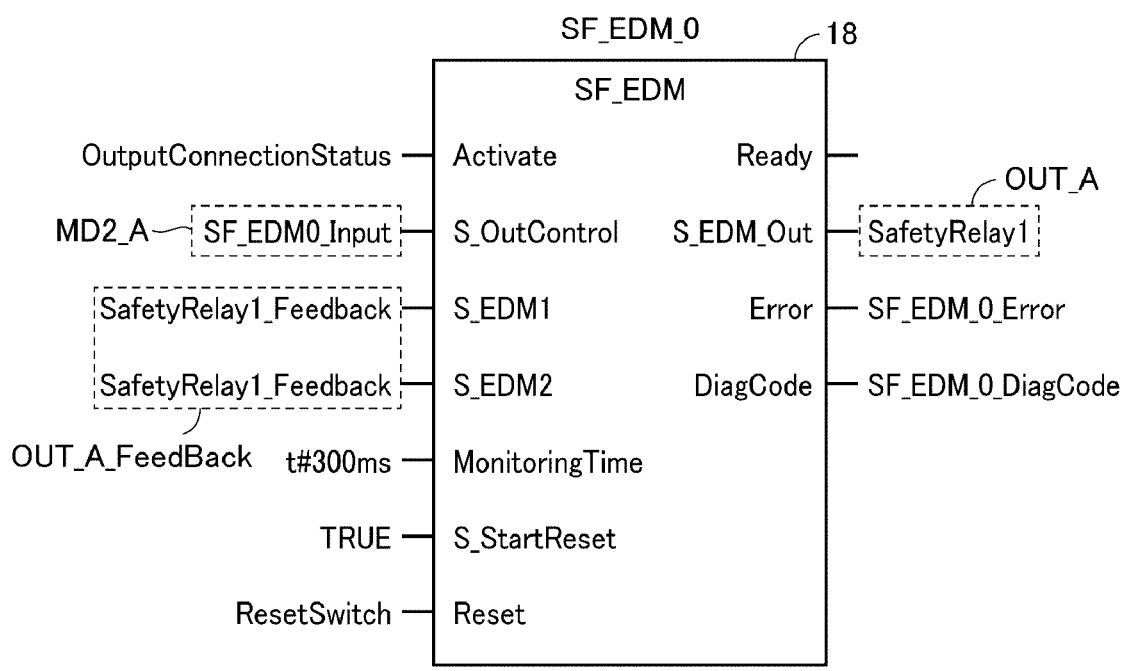
FIG. 15 is a diagram showing one of output FBs that are acquired from the output device settings.

FIG. 15 is a diagram showing one of the output FBs acquired from the output device setting 228. FIG. 15 illustrates an output check FB 18 as one of the output FBs that are acquired from the output device setting 228. The output check FB 18 is a logic for checking whether the output devices are functioning as ordered. Typically, the output check FB 18 is an external device monitoring (EDM) function block.

The output check FB 18 has a total of seven inputs, namely "Activate" for setting activation/inactivation of processing of the function block, "S_OutControl" to which a signal indicating an operation command of a safety component is input, "S_EDM1" and "S_EDM2" to which a signal indicating a state value of the safety component is input, "MonitoringTime" to which a value indicating a health monitoring cycle, "S_StartReset" to which a signal of setting whether or not execution of the program after reset is input, and "Reset" to which a signal for resetting operation after the safety operation is input.

In addition, the output check FB 18 has a total of four outputs, namely "Ready" for outputting a signal indicating whether or not the function block is in the operating state, "S_EDM_OUT" for outputting a final signal indicating the safety operation for the safety component, "Error" for outputting a signal indicating occurrence of certain error, and "DiagCode" for outputting a code corresponding to content of the error that has occurred.

The output check FB 18 changes a command value to be provided to the target safety component from "S_EDM_OUT" in accordance with an input value to "S_OutControl" and determines whether or not the state value of the safety component coincides with the command value. In this manner, it is possible to detect problems such as immovability due to disconnection of a safety relay and constant operations due to welding or the like, for example.

<E. Control Structure of Information Processing Apparatus 200>

Figure 16:
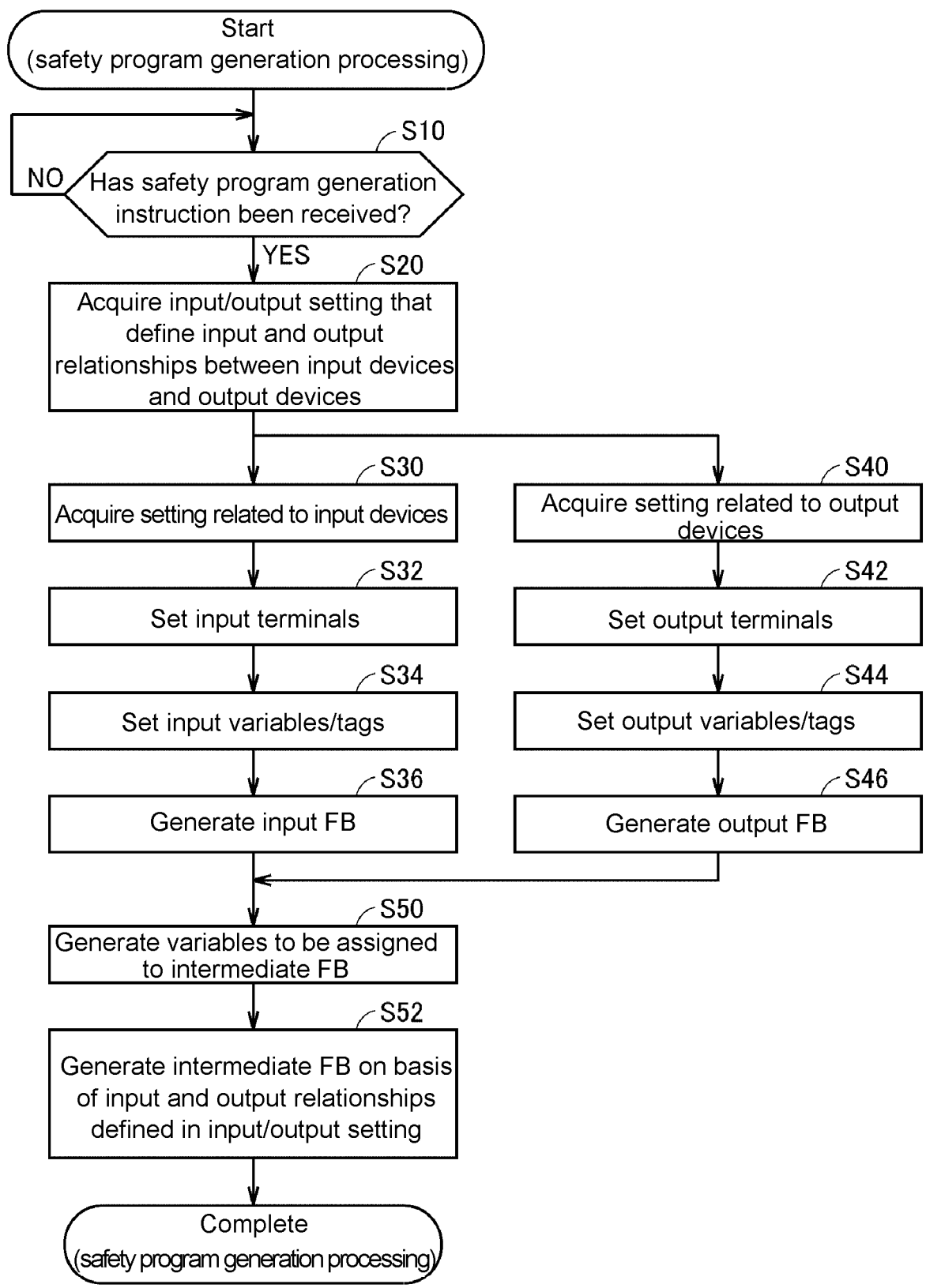
FIG. 16 is a diagram illustrating a flow of the safety program.

A control structure of the information processing apparatus 200 will be described with reference to FIG. 16. FIG. 16 is a diagram illustrating a flow of a safety program. Processing in FIG. 16 is realized by the processor 202 of the information processing apparatus 200 executing the program. In another aspect, a part or an entirety of the processing may be executed by a circuit element or other hardware.

In Step S10, the processor 202 determines whether or not a safety program generation instruction has been received. In a case in which it is determined that the safety program generation instruction has been received (YES in Step S10), the processor 202 switches the control to Step S20. If not (NO in Step S10), the processor 202 executes the processing in Step S10 again.

In Step S20, the processor 202 serves as the aforementioned acquisition unit 284 (see FIG. 5) and acquires the input/output setting 230 (see FIG. 7) that define the input and output relationships between the input devices and the output devices.

Processing in Steps S30 to S36 and processing in Steps S40 to S46 following the processing in Step S20 are preferably executed in parallel.

In Step S30, the processor 202 acquires setting related to the input devices set by the user. Typically, the processor 202 acquires setting related to input terminals of the respective input devices.

In Step S32, the processor 202 reflects the setting of the input terminals, which has been acquired in Step S30, in the respective input devices. In one example, the processor 202 reflects the input duplication setting set in the input type display section 618 in the aforementioned user interface 600 (see FIG. 6) or the reset type setting set in the reset type display section 616 in the user interface 600 in the respective input devices.

In Step S34, the processor 202 generates input variables indicating the input terminals set in Step S32. Alternatively, the processor 202 may generate tags indicating positions of the input terminals.

In Step S36, the processor 202 serves as the aforementioned input FB generation unit 288 (see FIG. 5) and acquires the types of the input devices defined in the input/output setting 230, which have been acquired in Step S20. Next, the processor 202 specifies the input FBs correlated with the acquired types of the input devices with reference to the input device setting 227 (see FIG. 9). Thereafter, the processor 202 assigns the input variables (or the tags) generated in Step S34 to the specified input FBs.

In Step S40, the processor 202 acquires setting related to the output devices set by the user. Typically, the processor 202 acquires setting related to output terminals of the respective output devices.

In Step S42, the processor 202 reflects the setting of the output terminals, which has been acquired in Step S40, in the respective output devices. The processor 202 reflects the input duplication setting set in the input type display section 618 in the aforementioned user interface 600 (see FIG. 6) or the reset type setting set in the reset type display section 616 in the user interface 600 in the respective output devices.

In Step S44, the processor 202 generates output variables indicating the output terminals set in Step S42. Alternatively, the processor 202 may generate tags indicating positions of the output terminals.

In Step S46, the processor 202 serves as the aforementioned output FB generation unit 292 (see FIG. 5) and acquires types of the output devices defined in the input/output setting 230, which have been acquired in Step S20. Next, the processor 202 specifies the output FBs correlated with the acquired types of the output devices with reference to the output device setting 228 (see FIG. 14). Thereafter, the processor 202 assigns the output variables (or the tags), which have been generated in Step S44, to the specified output FBs.

In Step S50, the processor 202 generates the first intermediate variables to be assigned as inputs to the respective intermediate FBs and the second intermediate variables to be assigned as outputs to the respective intermediate FBs.

In Step S52, the processor 202 serves as the aforementioned intermediate FB generation unit 290 (see FIG. 5) and generates the AND operators as the intermediate FBs. The first and second intermediate variables generated in Step S50 are assigned to the respective intermediate FBs. The first and second intermediate variables are assigned to the respective intermediate FBs in accordance with the input and output relationships between the input devices and the output devices defined in the input/output setting 230, which have been acquired in Step S20. Typically, the processor 202 connects the first intermediate variables and the second intermediate variables by the AND operators such that a connection relation is established for the combinations between the input devices and the output devices for which "FALSE" (that is, 0) is defined in the input/output setting 230.

In addition, although the example in which the intermediate FBs are generated after the input FBs and the output FBs are generated in parallel has been described in the example in FIG. 16, the input FBs, the output FBs, and the intermediate FBs are generated in an arbitrary order. In one example, the processor 202 may generate the respective FBs in the order of the input FBs, the output FBs, and the intermediate FBs or may generate the respective FBs in the order of the intermediate FBs, the input FBs, and the output FBs.

As described above, a designer can set the input and output relationships between the input devices and the output devices on the user interface 600 (see FIG. 6). In this manner, the input/output setting 230 (see FIG. 7) that define the input and output relationships between the input devices and the output devices are generated. The information processing apparatus 200 generates the safety program 10 on the basis of the input/output setting 230. In a case in which a value of an input signal from any of the input devices defined in the input/output setting 230 changes from "TRUE" (first input value) to "FALSE" (second input value), the safety program 10 shifts the operating state of the output device, which has been defined, to the safety state so as to respond to the change.

In this manner, if the input/output setting 230 is provided, the information processing apparatus 200 generates the safety program 10 to perform signal processing for realizing the input and output relationships. It becomes easy to design the safety program in relation to the input and output relationships between the input devices and the output devices by mounting such a generation function.

Second Embodiment

<A. Outline>

The user checks whether or not the input and output device or the safety program is operating normally in some cases. In such cases, early specification of a location where a defect has occurred in the input and output device or the safety program is required. In order to specify the location of the defect early, it is necessary for the user to operate the input and output device in a different manner from an ordinary manner. Thus, an information processing apparatus 200 according to the second embodiment not only generates a control command for the output devices at the ordinary time but also generates a control command for the output devices at the time of maintenance. In this manner, the information processing apparatus 200 can generate the safety program capable of addressing various situations.

Since other points, such as a hardware configuration, of the information processing apparatus 200 according to the second embodiment are the same as those of the information processing apparatus 200 according to the first embodiment, the description thereof will not be repeated below.

<B. User Interface>

Figure 17:
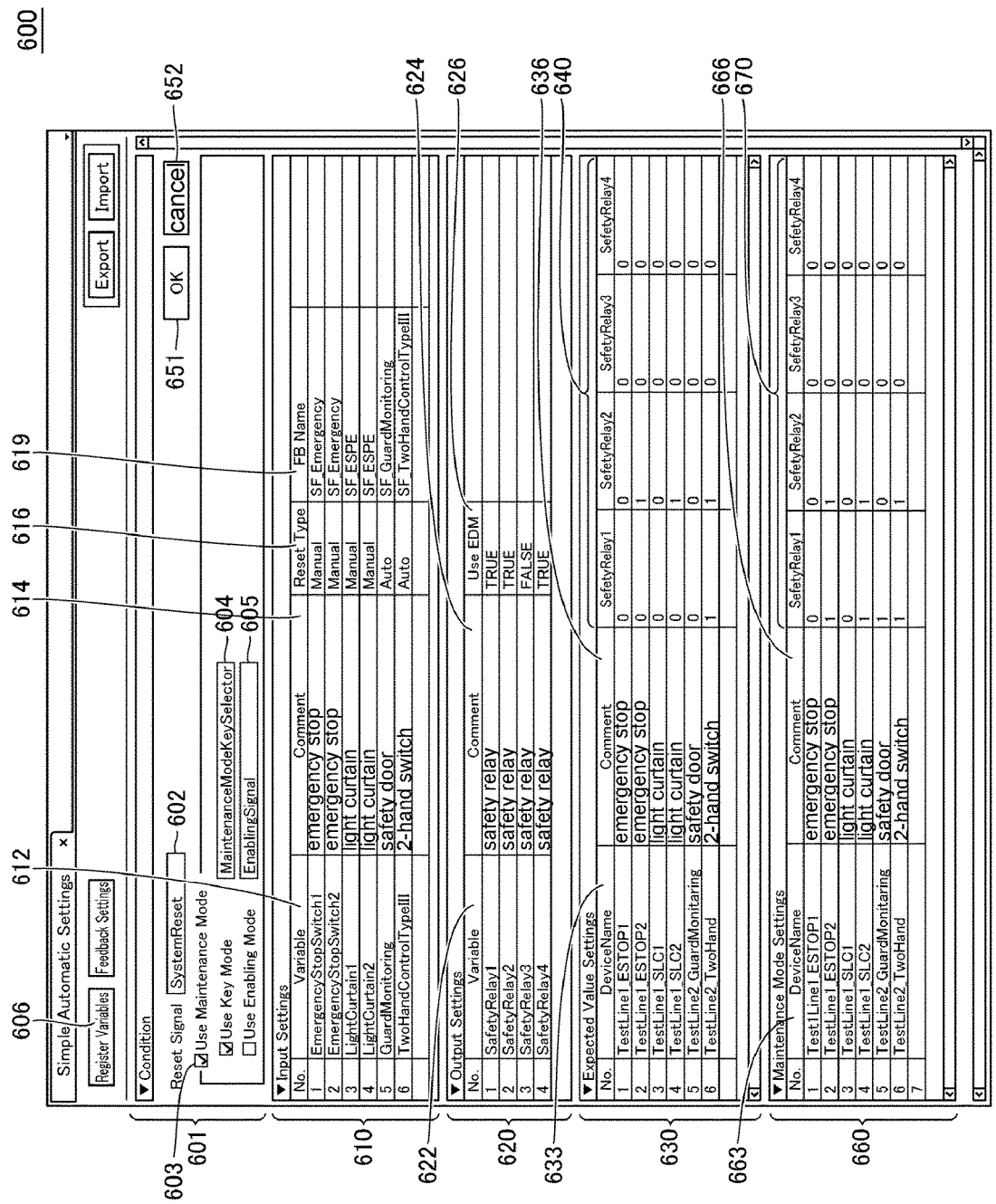
FIG. 17 is a diagram illustrating an example of a user interface according to a second embodiment.

As described above, the provision unit 282 (see FIG. 5) provides the user interface 600 for designing the safety program 10. Hereinafter, the user interface 600 according to the second embodiment will be described. FIG. 17 is a diagram illustrating an example of the user interface 600 according to the second embodiment.

The user interface 600 includes a generation condition display area 601 for setting safety program generation conditions, an input setting display area 610 for displaying setting values related to the input signals (input variables) from the input devices, an output setting display area 620 for displaying setting values related to output signals (output variables) to the output devices, and input and output relationship setting areas 630 and 660 for setting the correspondence between the input variables and the output variables.

The generation condition display area 601 includes a variable setting section 602 that receives setting related to reset signals. It is determined whether or not a reset operation is performed in accordance with states of the input variables set in the variable setting section 602. In the example in FIG. 17, "ResetSwitch" is set as a variable name in the variable setting section 602. The variable "ResetSwitch" is added as an input to the input FBs for which the aforementioned reset type is set to the manual reset (see FIGS. 10 and 11).

The generation condition display area 601 further includes a checkbox 603 for receiving whether or not to use a manual mode. If the safety program 10 is generated in a state where a check is not put in the checkbox 603, the information processing apparatus 200 generates only a control command for the output devices in an ordinary operation mode. That is, the information processing apparatus 200 generates the safety program 10 as described in the aforementioned "first embodiment". If the safety program 10 is generated in a state where a check is put in the checkbox 603, the information processing apparatus 200 not only generates a control command (hereinafter, also referred to as an "ordinary operation program") for the output devices in the ordinary operation mode but also generates a control command (hereinafter, also referred to as a "maintenance program") for the output devices in the maintenance mode. The maintenance mode described herein is an operation mode for checking whether or not the safety program 10 or the input and output device is operating normally.

The generation condition display area 601 further includes a variable setting section 604 related to variables for the maintenance mode. More specifically, the user uses a key for activating the maintenance mode at the time of the maintenance of the input and output device in some cases. The maintenance program determines whether or not the key is turned on by monitoring the values of the variables set in the variable setting section 604. Typically, the maintenance program is not executed when the key is set to off.

The generation condition display area 601 further includes a variable setting section 605 related to variables for the maintenance mode. More specifically, the user can activate any of the ordinary operation mode and the maintenance mode by a user's operation for the generated safety program 10. The safety program 10 determines whether or not the maintenance mode has been activated on the basis of the value set in the variable setting section 605. In one example, the maintenance mode is inactivated in a case in which the value of the variable set in the variable setting section 605 are "FALSE" (that is, 0).

In the input setting display area 610, information related to the input variables included in the target safety program can be registered and displayed. The input setting display area 610 includes a variable name display section 612 for displaying variable names of the input variables for the aforementioned input FB, a comment display section 614 for displaying comments for the respective input variables, a reset type display section 616 for displaying reset types for the respective input variables, and an input FB display section 619 for displaying names of the input FBs correlated with the respective input variables. In addition, although the input variables are displayed in the variable name display section 612 in the example in FIG. 17, identification information (for example, names of the input devices or the like) of the input devices may be displayed instead.

In the output setting display area 620, information related to the output variables included in the target safety program can be registered and displayed. The output setting display area 620 includes a variable name display section 622 for displaying variable names of the output variables from the aforementioned output FBs, a comment display section 624 for displaying comments for the respective output variables, and an EDM setting display section 626 for displaying setting about whether or not to use the aforementioned EDM function block. Typically, in a case in which "TRUE" is set in the EDM setting display section 626, the EDM function block is generated for the corresponding output variables. In a case in which "FALSE" is set in the EDM setting display section 626, the EDM function block is not generated for the corresponding output variables.

The input variables in the input setting display area 610 and the output variables in the output setting display area 620 are realized by the variable registration button 606 being selected. Alternatively, the input variables and the output variables may be directly input to the input setting display area 610 and the output setting display area 620 by user's operation or may be selected from candidates registered in advance by using a pull-down menu or the like. According to an embodiment, the input variables and the output variables can be input to the input setting display area 610 and the output setting display are 620 by copy and paste.

In the input and output relationship setting area 630, the input and output relationships between the input devices and the output devices in the ordinary operation mode are set. More specifically, the input and output relationship setting area 630 includes an input device display area 633 for displaying the input devices, a comment display section 636 for displaying comments for the respective input devices, and the setting region group 640 for setting the input and output relationships between the input devices and the output devices. In addition, although the input device names are represented in the input device display area 633 in the example in FIG. 17, the input variables corresponding to the respective input devices may be displayed in the input device display area 663 as described above in the aforementioned FIG. 6. In this case, the correspondence between the input variables and the input devices is set in advance, and the input devices corresponding to the respective input variables are specified on the basis of the correspondence.

In the input and output relationship setting area 660, the input and output relationships between the input devices and the output devices in the maintenance mode are set. More specifically, the input and output relationship setting area 660 includes an input device display area 663 for displaying the input devices, a comment display section 666 for displaying comments for the respective input devices, and a setting region group 670 (another setting region group) for setting the input and output relationships between the input devices and the output devices. In addition, although the input device names are represented in the input device display area 663 in the example in FIG. 17, the input variables corresponding to the input devices may be displayed instead. In this case, the correspondence between the input variables and the input devices is set in advance, and the input devices corresponding to the respective input variables are specified on the basis of the correspondence.

According to an embodiment, the input and output relationship setting area 660 is displayed on the basis of the event that the use of the maintenance mode has been set to be activated in the user interface 600 and the checkbox 603. That is, display and non-display of the input and output relationship setting area 660 are switched in conjunction with an operation performed on the checkbox 603. More specifically, in a case in which a check is put in the checkbox 603, the user interface 600 determines that the use of the maintenance mode has been set to be activated and displays the input and output relationship setting area 660. In a case in which the check is eliminated from the checkbox 603, the user interface 600 determines that the use of the maintenance mode is set to be inactivated and does not display the input and output relationship setting area 660.

The respective setting regions in the setting region group 670 are arranged in a matrix form. The respective setting regions in the setting region group 670 are prepared to correspond to the number of combinations between the input devices registered in the input setting display area 610 and the output devices registered in the output setting display area 620. The input devices (input variables) represented in the input setting display area 610 are associated with a column direction of the setting region group 670. The output devices (output variables) represented in the output setting display area 620 are associated in a row direction of the setting region group 670. The respective setting regions that form the setting region group 670 receive setting indicating whether or not the output devices associated with the setting regions are to respond to changes in values of the input signals from the input devices associated with the setting regions. That is, the setting region group 670 is configured to receive the setting of the output devices that respond to the changes in the input signals from the input devices.

The setting region group 670 is configured such that output values are set to correspond to the number of target output variable for one input variable. In the example of the user interface 600 illustrated in FIG. 17, four sections are provided to correspond to four output variables displayed in the output setting display area 620, and the input/output setting can be set in the respective sections. The user sets necessary values in the setting region group 670 on the basis of prior safety design in the maintenance mode. In addition, "0" means that the corresponding output variables also change to "FALSE" in a case in which the corresponding input variables change to "FALSE", and "1" means that the corresponding output variables are maintained to be "TRUE" even in a case in which the corresponding input variables change to "FALSE" in the setting region group 670 in FIG. 17.

According to an embodiment, the user interface 600 reflects the setting values set in the setting region group 640 as initial values in the setting region group 670 when the setting region group 670 is displayed. Thereafter, the user sets the input and output relationships in the maintenance mode in the setting region group 670. The setting of the input and output relationships in the maintenance mode is simplified by reflecting the setting values in the setting region group 640 as the initial values in the setting region group 670.

If the OK button 651 is pressed, the information processing apparatus 200 generates a first control command (that is, an ordinary operation program) for the output devices in the ordinary operation mode on the basis of the input and output relationships set in the setting region group 640 and generates a second control command (that is, a maintenance program) for the output devices in the maintenance mode on the basis of the input and output relationships set in the setting region group 670. In this manner, the safety program 10 including the ordinary operation program and the maintenance program is generated.

More specifically, in a case in which a value of an input signal from any of the input devices defined in the setting region group 640 changes from "TRUE" (first input value) to "FALSE" (second input value), the ordinary operation program shifts the operating state of the output devices, which has been set to respond to the change in the value of the input signal, to the safety state. In a case in which a value of an input signal from any of the input devices defined in the setting region group 640 changes from "TRUE" (first input value) to "FALSE" (second input value), the maintenance program shifts the operating state of the output device, which has been set to respond to the change in the value of the input signal, to the safety state.

The safety program 10 is configured to be able to receive a command for activating any one of the ordinary operation program and the maintenance program. In a case in which the ordinary operation program is set to be activated, the ordinary operation program is executed. In a case in which the maintenance program is set to be activated, the maintenance program is executed.

In addition, although FIG. 17 shows the example in which only one input and output relationship setting area 660 related to the maintenance mode is displayed in the user interface 600, a plurality of input and output relationship setting areas 660 may be displayed in the user interface 600. That is, the user interface 600 is configured to display the same number of input and output relationship setting areas 660 as the number of maintenance modes in a case in which the user defines a plurality of control matters in the maintenance modes. In this manner, the user can automatically generate different types of maintenance programs.

<C. Intermediate FB>

The generation unit 286 (see FIG. 5) generates the input FBs, the intermediate FBs, and the output FBs on the basis of the input and output relationships between the input devices and the output devise as described in the "first embodiment". The generation unit 286 according to the embodiment further generates not only the respective FBs for the ordinary operation mode but also the respective FBs for the maintenance mode in a case in which the use of the maintenance mode is set to be activated. More specifically, the generation unit 286 generates the input FBs and the output FBs for the ordinary operation mode on the basis of the input and output relationships set in the setting region group 640 related to the ordinary operation mode and generates the input FBs and the output FBs for the maintenance mode on the basis of the input and output relationships set in the setting region group 670 related to the maintenance mode. Thereafter, the generation unit 286 generates the intermediate FBs for connecting the input FBs and the output FBs generated for the respective modes.

The intermediate FBs are generated by the aforementioned intermediate FB generation unit 290 (see FIG. 5), for example. Hereinafter, a method of generating the intermediate FBs by the intermediate FB generation unit 290 will be described with reference to FIG. 18. In addition, since the method of generating the input FBs and the output FBs is as described above in the "first embodiment", the description of the method of generating the input FBs and the output FBs will not be repeated.

Figure 18:
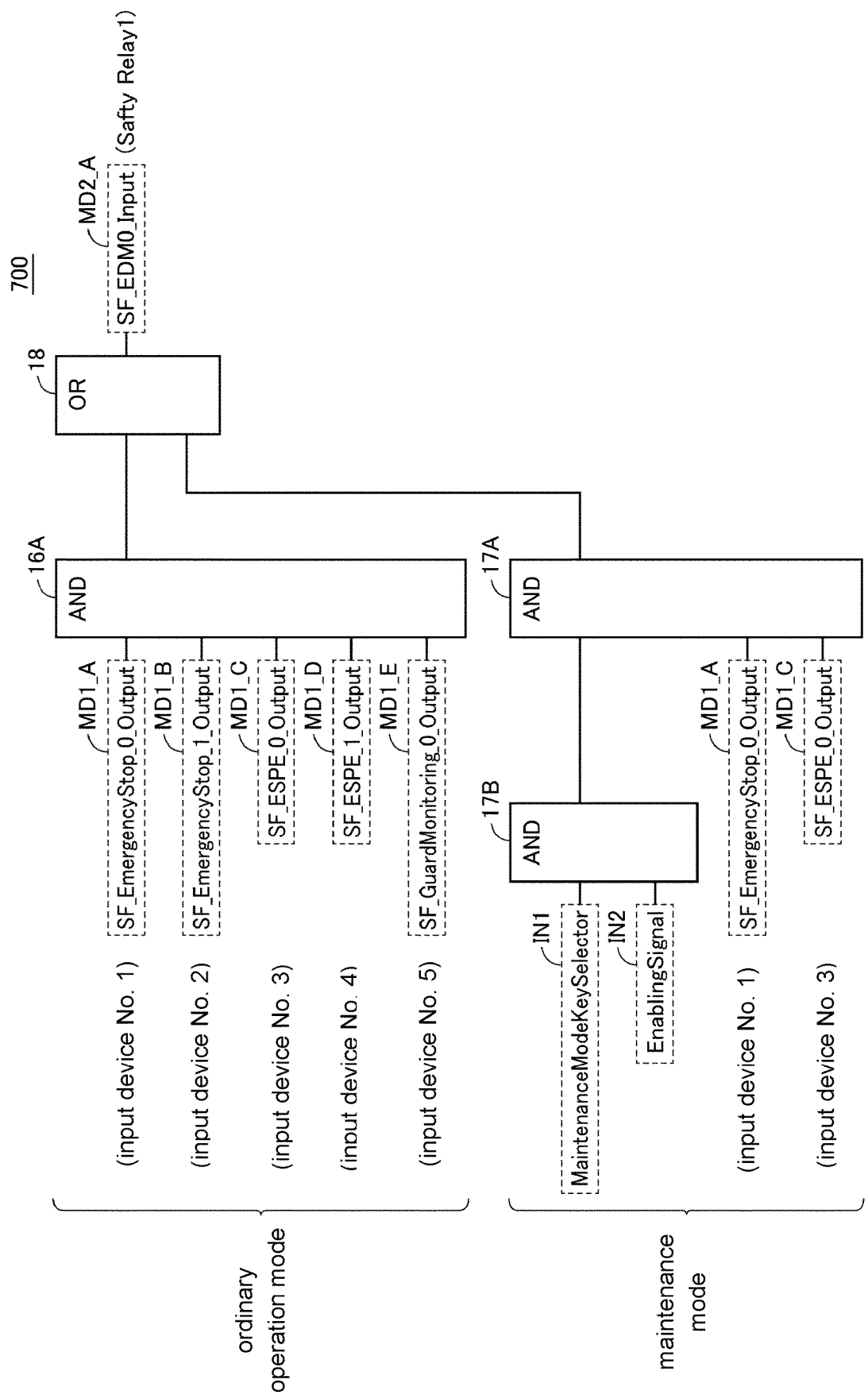
FIG. 18 is a diagram showing one of intermediate FBs that are generated by the intermediate FB generation unit.

FIG. 18 is a diagram showing one of the intermediate FBs that are generated by the intermediate FB generation unit 290. FIG. 18 shows an intermediate FB 700 as an example of the generated intermediate FBs. The intermediate FB 700 is generated for "SafetyRelay1" (see FIG. 17) as an example of the output devices.

A connection relation is established for combinations between the input devices and the output devices, for which "FALSE" (that is, 0) is set in the setting region groups 640 and 670. In one example, "0" is associated with input devices "No. 1" to "No. 5" for "SafetyRelay1" in the setting region group 640 illustrated in FIG. 17. Therefore, a connection relation is established by the AND operator 16A for "SafetyRelay1" and the input devices "No. 1" to "No. 5". Therefore, the first intermediate variables MD1_A to MD1_E (see FIG. 8) corresponding to the input devices "No. 1" to "No. 5" are assigned as inputs to the AND operator 16A.

Similarly, "0" is associated with the input devices "No. 1" and "No. 3" for "SafetyRelay1" in the setting region group 670 illustrated in FIG. 17. Therefore, a connection relation is established by an AND operator 17A for "SafetyRelay1" and the input devices "No. 1" and "No. 3". Therefore, the first intermediate variables MD1_A and MD1_C (see FIG. 8) corresponding to the input devices "No. 1" and "No. 3" are assigned as inputs to the AND operator 17A.

As described above, the AND operator 16A is provided for the ordinary operation mode, and the AND operator 17A is provided for the maintenance mode. Output values of the AND operators 16A and 17A follows the current operation mode. Typically, in a case in which the ordinary operation mode is set as the current operation mode, the AND operator 17A is configured to constantly output "FALSE" (that is, 0) regardless of the values of the first intermediate variables MD1_A to MD1_C for the maintenance mode. Meanwhile, in a case in which the maintenance mode is set as the current operation mode, the AND operator 16A is configured to constantly output "FALSE" (that is, 0) regardless of the values of the first intermediate variables MD1_A to MD1_E for the ordinary operation. In this manner, the output values of the AND operators 16A and 17A are switched in accordance with the current operation mode.

In order to realize such switching of control depending on the operation mode, an AND operator 17B, for example, is connected to the AND operator 17A for the maintenance mode. Input variable IN1 and IN2 for setting whether or not to activate the maintenance mode are assigned to the AND operator 17B. The input variable IN1 becomes "TRUE" (that is, 1) in a case in which the key for activating the maintenance mode indicates ON, and the input variable IN1 becomes "FALSE" (that is, 0) in a case in which the key indicates OFF. In addition, the input variable IN2 becomes "TRUE" (that is, 1) in a case in which the maintenance mode has been set to be activated, and the input variable IN2 becomes "FALSE" (that is, 0) in a case in which the setting has been set to be inactivated. In a case in which any of the input variables IN1 and IN2 indicates "FALSE" (that is, 0), an output from the AND operator 17B becomes "FALSE" (that is, 0). As a result, an output from the AND operator 17A also becomes "FALSE" (that is, 0). That is, in a case in which the maintenance mode has been set to be inactivated, the output from the AND operator 17A constantly becomes "FALSE" (that is, 0) regardless of the states of the input devices "No. 1" and "No. 3". In this manner, the maintenance mode is inactivated.

In this manner, the safety program 10 is configured to be able to receive a command for inactivating the maintenance mode. In this manner, activation and inactivation of the maintenance mode is appropriately switched.

In addition, although the example in which the AND operator 17B for inactivating the maintenance mode is connected to the AND operator 17A has been described above, an AND operator for inactivating the ordinary operation mode may further be connected to the AND operator 16A. That is, the safety program is configured to be able to receive a command for inactivating any one of the ordinary operation mode and the maintenance mode. In this manner, the user can appropriately switch the ordinary operation mode and the maintenance mode in accordance with purposes.

As described above, the user interface 600 according to the second embodiment is configured to be able to set not only the input and output relationships between the input and output devices in the ordinary operation mode but also the input and output relationships between the input and output devices in the maintenance mode. In this manner, the information processing apparatus 200 can generate the safety program corresponding to the plurality of operation modes.

According to an aspect, there is provided an information processing apparatus that generates a safety program for causing output devices to operate such that safety is maintained if a predetermined condition is satisfied, the information processing apparatus including: an acquisition unit that acquires an input/output setting, wherein the input/output setting correlates respective input devices with output devices that respond to changes in values of input signals from the input devices from a first input value that is an initial value to a second input value; and a generation unit that generates a safety program for shifting an operation state of an output device correlated with the input device to a safety state in a case in which a value of an input signal from any of the input devices defined in the input/output setting has changed from the first input value to the second input value.

Preferably, the information processing apparatus further includes a provision unit that provides a user interface for receiving a setting operation of the input/output setting.

Preferably, the user interface is configured to receive a setting of the output devices that respond to the changes in the input signals from the input devices for the respective input devices defined in the input/output setting.

Preferably, the user interface includes a setting region group displayed in a matrix form. Each input device defined in the input/output setting is associated with one of a row direction and a column direction of the setting region group. Each output device defined in the input/output setting is associated with the other of the row direction and the column direction of the setting region group. Each setting region included in the setting region group receives a setting indicating whether or not an output device associated with the setting region is to respond to a change in a value of an input signal from an input device associated with the setting region.

Preferably, the user interface is configured to be able to select an input device to be included in the input/output setting from among the plurality of input devices set in advance.

Preferably, the user interface is configured to be able to select an output device to be included in the input/output setting from among the plurality of output devices set in advance.

Preferably, the user interface is configured to further receive a setting indicating whether or not to duplicate an input signal output from an input device for each input device defined in the input/output setting.

Preferably, the user interface is configured to be able to receive setting about whether or not to use a maintenance mode, and another setting region group that is different from the setting region group is further displayed on the basis of the fact that use of the maintenance mode has been set to be activated.

Preferably, the user interface reflects a setting value set in the setting region group as an initial value in another setting region group when another setting region group is displayed.

Preferably, the generation unit includes, in the safety program, a first control command for shifting the operation state of a set output device to the safety state in response to a change in the value of the input signal in a case in which the value of the input signal from any of the input devices defined in the setting region group is changed from the first input value to the second input value, and a second control command for shifting the operation state of a set output device to the safety state in response to a change in the value of the input signal from any of the input devices defined in another setting region group is changed from the first input value to the second input value.

According to another aspect, there is provided an information processing method for generating a safety program for causing output devices to operate such that safety is maintained if a predetermined condition is satisfied, the method comprising the steps of: acquiring input/output setting, wherein the input/output setting correlates respective input devices with output devices that respond to changes in values of input signals from the input devices from a first input value that is an initial value to a second input value; and generating, in a case in which a value of an input signal from any of the input devices defined in the input/output setting has changed from the first input value to the second input value, a safety program for shifting an operation state of an output device correlated with the input device to a safety state.

According to another aspect, there is provided a non-transitory computer readable storage medium for generating a safety program for causing output devices to operate such that safety is maintained if a predetermined condition is satisfied, the non-transitory computer readable storage medium storing a plurality of program instructions, wherein the program instructions are loaded into an information processing apparatus to execute the steps of: acquiring input/output setting, wherein the input/output setting correlates respective input devices with output devices that respond to changes in values of input signals from the input devices from a first input value that is an initial value to a second input value; and generating, in a case in which a value of an input signal from any of the input devices defined in the input/output setting has changed from the first input value to the second input value, a safety program for shifting an operation state of an output device correlated with the input device to a safety state.

According to an aspect, it is possible to facilitate the design of the safety program in relation to the input and output relationships between the input devices and the output devices.

It should be consider that the embodiments disclosed herein are for the illustrative purpose and are not intended to be restrictive in terms of all aspects. The scope of the disclosure is indicated by the claims rather than the above description and is intended to include all modifications within the meaning and the scope equivalent to the claims.

What is claimed is:

1. An information processing apparatus that generates a safety program for causing output devices to operate such that safety is maintained if a predetermined condition is satisfied, the information processing apparatus comprising:
an acquisition unit that acquires an input/output setting,
wherein the input/output setting correlates respective input devices with output devices that respond to changes in values of input signals from the input devices from a first input value that is an initial value to a second input value; and
a generation unit that generates a safety program for shifting an operation state of an output device correlated with the input device to a safety state in a case in which a value of an input signal from any of the input devices defined in the input/output setting has changed from the first input value to the second input value; and
a provision unit that provides a user interface for receiving a setting operation of the input/output setting,
wherein the safety program is formed from input function blocks, intermediate function blocks, and output function blocks,
the generation unit is configured to generate the input function blocks for the respective input devices defined in the input/output setting, is configured to generate the intermediate function blocks on the basis of the input and output relationships between the input devices and the output devices defined in the input/output setting, and is configured to generate the output function blocks for the respective output devices defined in the input/output setting,
the input function blocks are used to receive the input signals from the input devices, the intermediate function blocks are used to perform logical computation on the input signals from the input function blocks, and the output function blocks are used to perform predetermined computation on intermediate signals from the intermediate function blocks and outputs output signals to the corresponding output devices,
wherein the user interface is configured to receive a setting of the output devices that respond to the changes in the input signals from the input devices for the respective input devices defined in the input/output setting,
the user interface includes a setting region group displayed in a matrix form,
each input device defined in the input/output setting is associated with one of a row direction and a column direction of the setting region group, each output device defined in the input/output setting is associated with the other of the row direction and the column direction of the setting region group, and each setting region included in the setting region group receives a setting indicating whether or not an output device associated with the setting region is to respond to a change in a value of an input signal from an input device associated with the setting region.

2. The information processing apparatus according to claim 1, wherein the user interface is configured to be able to select an input device to be included in the input/output setting from among the plurality of input devices set in advance.

3. The information processing apparatus according to claim 1, wherein the user interface is configured to be able to select an input device to be included in the input/output setting from among the plurality of input devices set in advance.

4. The information processing apparatus according to claim 1, wherein the user interface is configured to be able to select an input device to be included in the input/output setting from among the plurality of input devices set in advance.

5. The information processing apparatus according to claim 1, wherein the user interface is configured to be able to select an output device to be included in the input/output setting from among the plurality of output devices set in advance.

6. The information processing apparatus according to claim 1, wherein the user interface is configured to be able to select an output device to be included in the input/output setting from among the plurality of output devices set in advance.

7. The information processing apparatus according to claim 1, wherein the user interface is configured to be able to select an output device to be included in the input/output setting from among the plurality of output devices set in advance.

8. The information processing apparatus according to claim 1, wherein the user interface is configured to further receive a setting indicating whether or not to duplicate an input signal output from an input device for each input device defined in the input/output setting.

9. The information processing apparatus according to claim 1, wherein the user interface is configured to further receive a setting indicating whether or not to duplicate an input signal output from an input device for each input device defined in the input/output setting.

10. The information processing apparatus according to claim 1, wherein the user interface is configured to further receive a setting indicating whether or not to duplicate an input signal output from an input device for each input device defined in the input/output setting.

11. The information processing apparatus according to claim 1, wherein the user interface is configured to be able to receive setting about whether or not to use a maintenance mode, and another setting region group that is different from the setting region group is further displayed on the basis of the fact that use of the maintenance mode has been set to be activated.

12. The information processing apparatus according to claim 11, wherein the user interface reflects a setting value set in the setting region group as an initial value in the another setting region group when the another setting region group is displayed.

13. The information processing apparatus according to claim 11 wherein the generation unit includes, in the safety program, a first control command for shifting the operation state of a set output device to the safety state in response to a change in the value of the input signal in a case in which the value of the input signal from any of the input devices defined in the setting region group is changed from the first input value to the second input value, and a second control command for shifting the operation state of a set output device to the safety state in response to a change in the value of the input signal in a case in which the value of the input signal from any of the input devices defined in the another setting region group is changed from the first input value to the second input value.

14. The information processing apparatus according to claim 12, wherein the generation unit includes, in the safety program, a first control command for shifting the operation state of a set output device to the safety state in response to a change in the value of the input signal in a case in which the value of the input signal from any of the input devices defined in the setting region group is changed from the first input value to the second input value, and a second control command for shifting the operation state of a set output device to the safety state in response to a change in the value of the input signal in a case in which the value of the input signal from any of the input devices defined in the another setting region group is changed from the first input value to the second input value.

15. An information processing method for generating a safety program for causing output devices to operate such that safety is maintained if a predetermined condition is satisfied, the method comprising the steps of:

acquiring an input/output setting, wherein the input/output setting correlates respective input devices with output devices that respond to changes in values of input signals from the input devices from a first input value that is an initial value to a second input value;

generating, in a case in which a value of an input signal from any of the input devices defined in the input/output setting has changed from the first input value to the second input value, a safety program for shifting an operation state of an output device correlated with the input device to a safety state; and providing a user interface for receiving a setting operation of the input/output setting, wherein the safety program is formed from input function blocks, intermediate function blocks, and output function blocks, the generation unit is configured to generate the input function blocks for the respective input devices defined in the input/output setting, is configured to generate the intermediate function blocks on the basis of the input and output relationships between the input devices and the output devices defined in the input/output setting, and is configured to generate the output function blocks for the respective output devices defined in the input/output setting, the input function blocks are used to receive the input signals from the input devices, the intermediate function blocks are used to perform logical computation on the input signals from the input function blocks, and the output function blocks are used to perform predetermined computation on intermediate signals from the intermediate function blocks and outputs output signals to the corresponding output devices, wherein the user interface is configured to receive a setting of the output devices that respond to the changes in the input signals from the input devices for the respective input devices defined in the input/output setting, the user interface includes a setting region group displayed in a matrix form, each input device defined in the input/output setting is associated with one of a row direction and a column direction of the setting region group, each output device defined in the input/output setting is associated with the other of the row direction and the column direction of the setting region group, and each setting region included in the setting region group receives a setting indicating whether or not an output device associated with the setting region is to respond to a change in a value of an input signal from an input device associated with the setting region.

16. A non-transitory computer readable storage medium for generating a safety program for causing output devices to operate such that safety is maintained if a predetermined condition is satisfied, the non-transitory computer readable storage medium storing a plurality of program instructions, wherein the program instructions are loaded into an information processing apparatus to execute the steps of:

acquiring an input/output setting, wherein the input/output setting correlates respective input devices with output devices that respond to changes in values of input signals from the input devices from a first input value that is an initial value to a second input value;

generating, in a case in which a value of an input signal from any of the input devices defined in the input/output setting has changed from the first input value to the second input value, a safety program for shifting an operation state of an output device correlated with the input device to a safety state; and providing a user interface for receiving a setting operation of the input/output setting, wherein the safety program is formed from input function blocks, intermediate function blocks, and output function blocks, the generation unit is configured to generate the input function blocks for the respective input devices defined in the input/output setting, is configured to generate the intermediate function blocks on the basis of the input and output relationships between the input devices and the output devices defined in the input/output setting, and is configured to generate the output function blocks for the respective output devices defined in the input/output setting, the input function blocks are used to receive the input signals from the input devices, the intermediate function blocks are used to perform logical computation on the input signals from the input function blocks, and the output function blocks are used to perform predetermined computation on intermediate signals from the intermediate function blocks and outputs output signals to the corresponding output devices, wherein the user interface is configured to receive a setting of the output devices that respond to the changes in the input signals from the input devices for the respective input devices defined in the input/output setting, the user interface includes a setting region group displayed in a matrix form, each input device defined in the input/output setting is associated with one of a row direction and a column direction of the setting region group, each output device defined in the input/output setting is associated with the other of the row direction and the column direction of the setting region group, and each setting region included in the setting region group receives a setting indicating whether or not an output device associated with the setting region is to respond to a change in a value of an input signal from an input device associated with the setting region.

\* \* \* \* \*